US012198845B2

(12) United States Patent
Ikriannikov

(10) Patent No.: US 12,198,845 B2
(45) Date of Patent: Jan. 14, 2025

(54) INTEGRATED INDUCTOR ASSEMBLIES AND ASSOCIATED SYSTEMS AND METHODS

(71) Applicant: Maxim Integrated Products, Inc., San Jose, CA (US)

(72) Inventor: Alexandr Ikriannikov, San Jose, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 607 days.

(21) Appl. No.: 17/454,457

(22) Filed: Nov. 10, 2021

(65) Prior Publication Data

US 2022/0181067 A1    Jun. 9, 2022

Related U.S. Application Data

(60) Provisional application No. 63/123,414, filed on Dec. 9, 2020.

(51) Int. Cl.
*H01F 27/28* (2006.01)
*H01F 27/24* (2006.01)

(52) U.S. Cl.
CPC .............. *H01F 27/28* (2013.01); *H01F 27/24* (2013.01)

(58) Field of Classification Search
CPC .......... H01F 27/28; H01F 27/24; H01F 27/40; H01F 27/26; H02M 1/32; H02M 3/1584
See application file for complete search history.

(56) References Cited

U.S. PATENT DOCUMENTS

| | | | |
|---|---|---|---|
| 7,295,092 B2 | 11/2007 | Elliott et al. | |
| 8,279,037 B2 | 10/2012 | Yan et al. | |
| 8,310,332 B2 | 11/2012 | Yan et al. | |
| 8,400,245 B2 | 3/2013 | Yan et al. | |
| 9,275,787 B2 | 3/2016 | Yan et al. | |
| 9,842,682 B2 | 12/2017 | Yan et al. | |
| 9,859,043 B2 | 1/2018 | Yan et al. | |
| 10,224,140 B2 | 3/2019 | Janis et al. | |
| 2008/0265858 A1* | 10/2008 | Muratov | H02M 3/1584 323/301 |
| 2017/0263369 A1* | 9/2017 | Gold | H02M 1/40 |
| 2022/0158558 A1* | 5/2022 | Ikriannikov | H02M 1/0064 |
| 2023/0369977 A1* | 11/2023 | Ikriannikov | H02M 1/44 |

* cited by examiner

*Primary Examiner* — Tuyen T Nguyen
(74) *Attorney, Agent, or Firm* — PdZ Patent Law, PLLC

(57) ABSTRACT

A switching power converter includes an integrated inductor assembly, a first switching stage, and a second switching stage. The integrated inductor assembly includes a magnetic core and first and second windings disposed at least partially in the magnetic core. The second winding is separated from the first winding by a separation portion of the magnetic core. The first switching stage is configured such that a first current flowing from the first switching stage to the first winding induces first magnetic flux flowing through the separation portion of the magnetic core. The second switching stage is configured such that a second current flowing from the second switching stage to the second winding induces second magnetic flux flowing through the separation portion of the magnetic core that opposes the first magnetic flux in the separation portion of the magnetic core.

9 Claims, 32 Drawing Sheets

INTEGRATED INDUCTOR ASSEMBLIES AND ASSOCIATED SYSTEMS AND METHODS

CROSS REFERENCE TO RELATED APPLICATIONS

This application claims benefit of priority to U.S. Provisional Patent Application Ser. No. 63/123,414, filed on Dec. 9, 2020, which is incorporate herein by reference.

BACKGROUND

An inductor is an electromagnetic device which stores energy proportionally to the square of the current. Inductors are commonly used as energy storage devices in switching power converters, including but not limited to, buck converters, boost converters, and buck-boost converters.

DETAILED DESCRIPTION OF THE EMBODIMENTS

Many switching power converters include a plurality of inductors. For example, a multi-phase switching power converter, including but not limited to, a multi-phase buck converter, a multi-phase boost converter, and a multi-phase buck-boost converter, includes a respective inductor for each phase. The inductors may be implemented by either a coupled inductor or by discrete inductors. A coupled inductor is an electromagnetic device that includes multiple inductors that are magnetically coupled together. Consequently, there is magnetic coupling between phases in a multi-phase power converter including a coupled inductor. A discrete inductor, in contrast, is not materially magnetically coupled to any other inductor. As a result, there is no significant magnetic coupling between phases in a multi-phase switching power converter including discrete inductors.

It is ordinarily desirable that a multi-phase switching power converter includes a coupled inductor instead of multiple discrete inductors. For example, use of a coupled inductor instead of a discrete inductor in a switching power converter may enable significant improvements in switching power converter transient response and/or efficiency. However, in some applications, coupled inductors may not be practical and discrete inductors may therefore be required.

Figure 1:
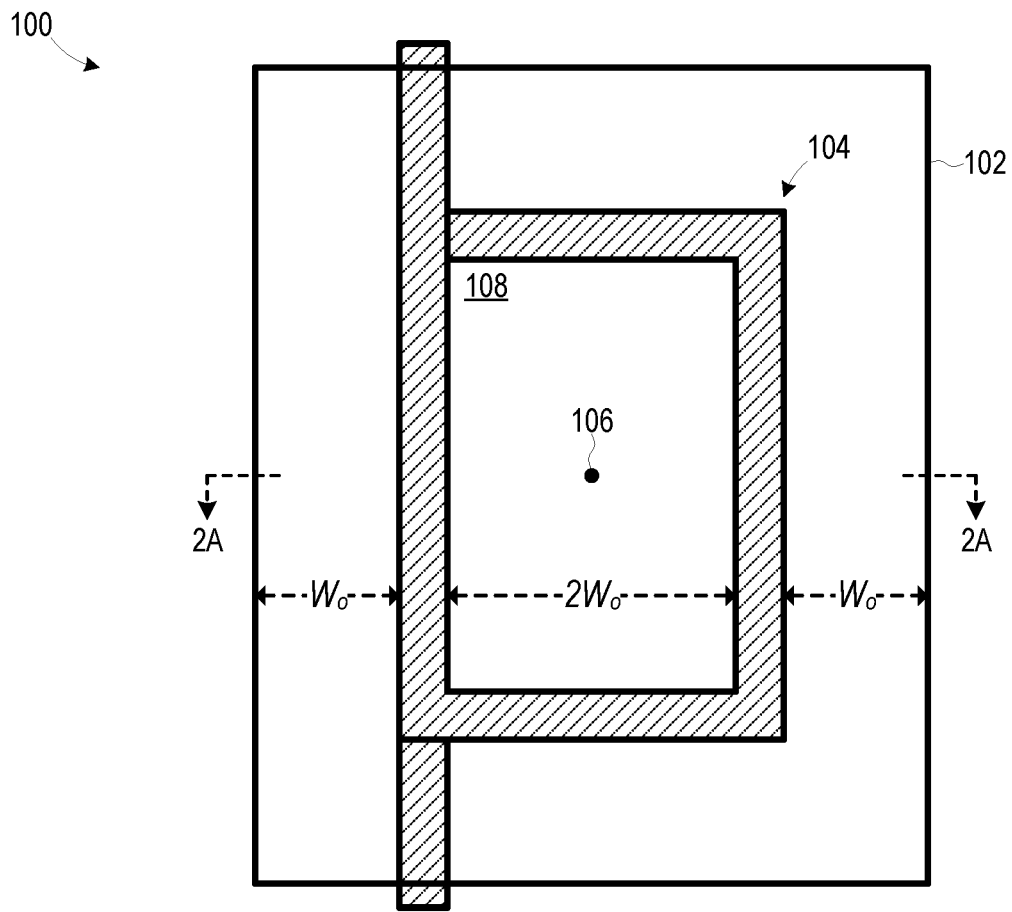
FIG. 1 is a top plan view of a discrete inductor.
Figure 2:
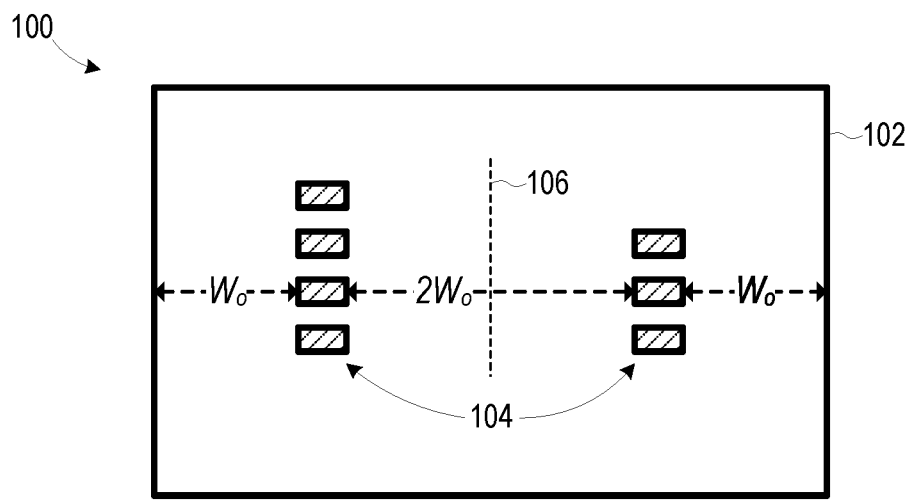
FIG. 2 is a cross-sectional view of the FIG. 1 discrete inductor, as seen when taken along line 2A-2A of FIG. 1.

FIGS. 1 and 2 collectively illustrate one example of a conventional discrete inductor. FIG. 1 is a top plan view of a discrete inductor 100, and FIG. 2 is a cross-sectional view of discrete inductor 100, as seen when taken along line 2A-2A of FIG. 1. Discrete inductor 100 includes a magnetic core 102 and a winding 104 embedded in magnetic core 102. Only the outline of magnetic core 102 is shown in FIG. 1 to enable winding 104 to be seen. Winding 104 is wound around a winding axis 106 extending in the vertical direction. While winding 104 is shown with 90 degree corners and rectangular cross section for simplicity, actual implementation may vary. An area 108 enclosed by winding 104 has a width 2 $W_o$, and each side of discrete inductor 100 has a width of $W_o$ outside of winding 104, to realize approximate uniform magnetic core cross section for magnetic flux flowing within discrete inductor 100.

Figure 3:
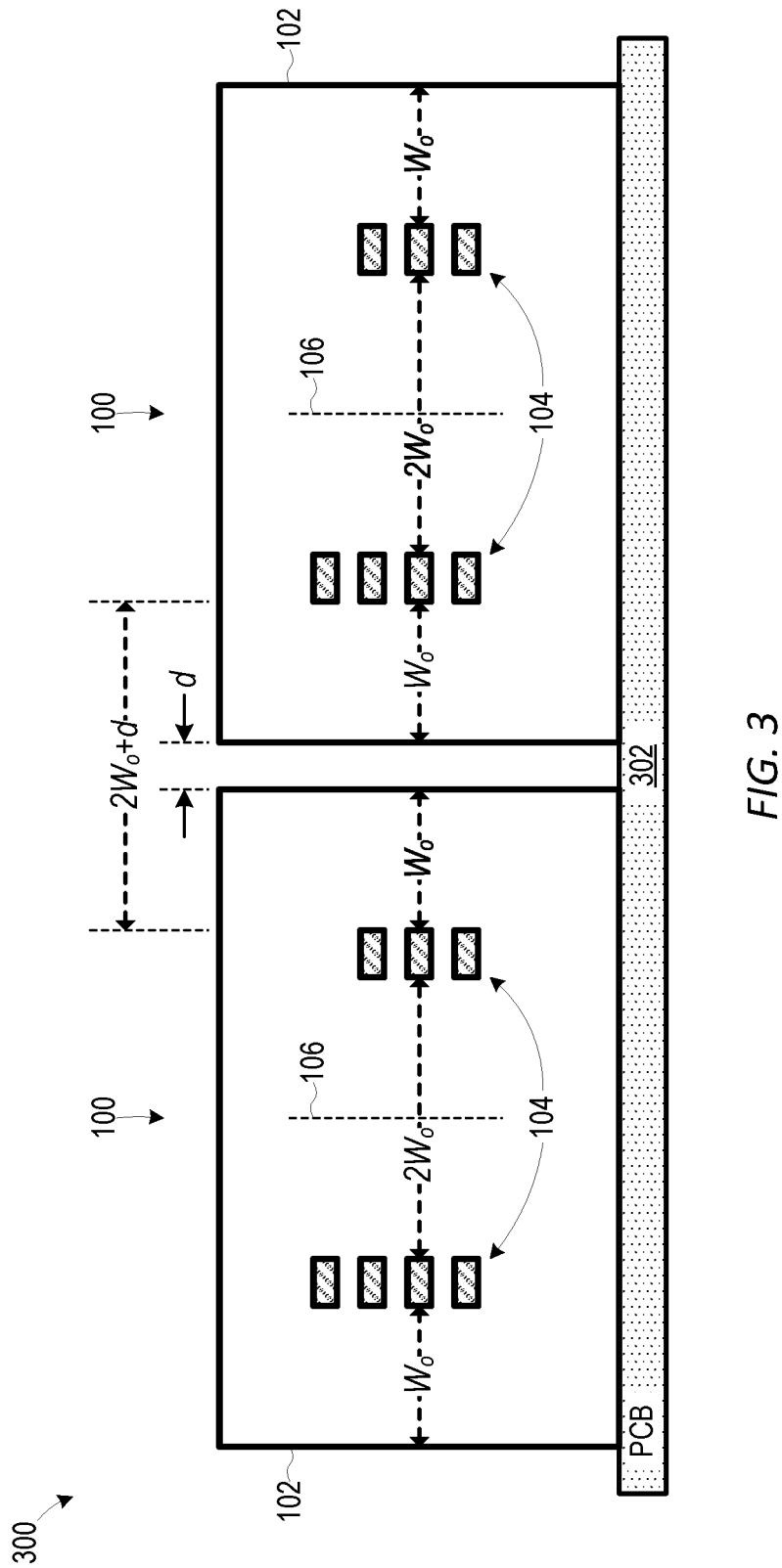
FIG. 3 is a cross-sectional view of a printed circuit assembly including a plurality of the FIG. 1 discrete inductors disposed on a printed circuit board, as seen when viewed in a horizontal direction.

It is often desirable to place discrete inductors close together in a multi-phase switching power converter, such as to help minimize switching power converter size and/or to help minimize length of electrical conductors connecting components together. For example, FIG. 3 is a cross-sectional view of printed circuit assembly (PCA) 300 including a plurality of discrete inductors 100 disposed on a printed circuit board (PCB) 302, as seen when viewed in a horizontal direction. Adjacent discrete inductors 100 must be separated by a minimum separation distance d, e.g. 0.5 to 1.0 millimeters, to comply with PCA manufacturing requirements. Accordingly, a minimum horizontal separation distance between adjacent windings 104 is 2Wo+d.

Figure 4:
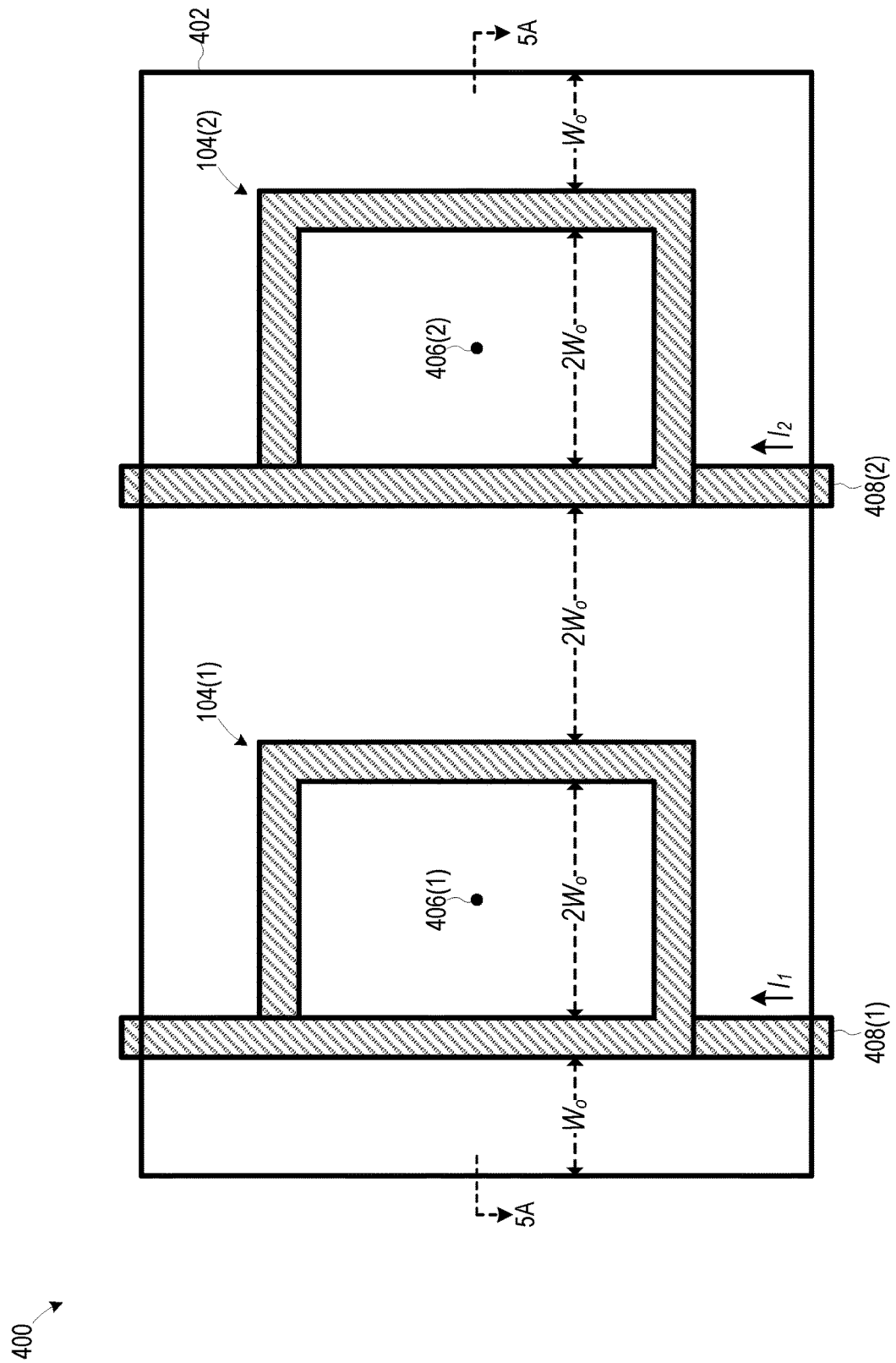
FIG. 4 is a top plan view of an inductor assembly.
Figure 5:
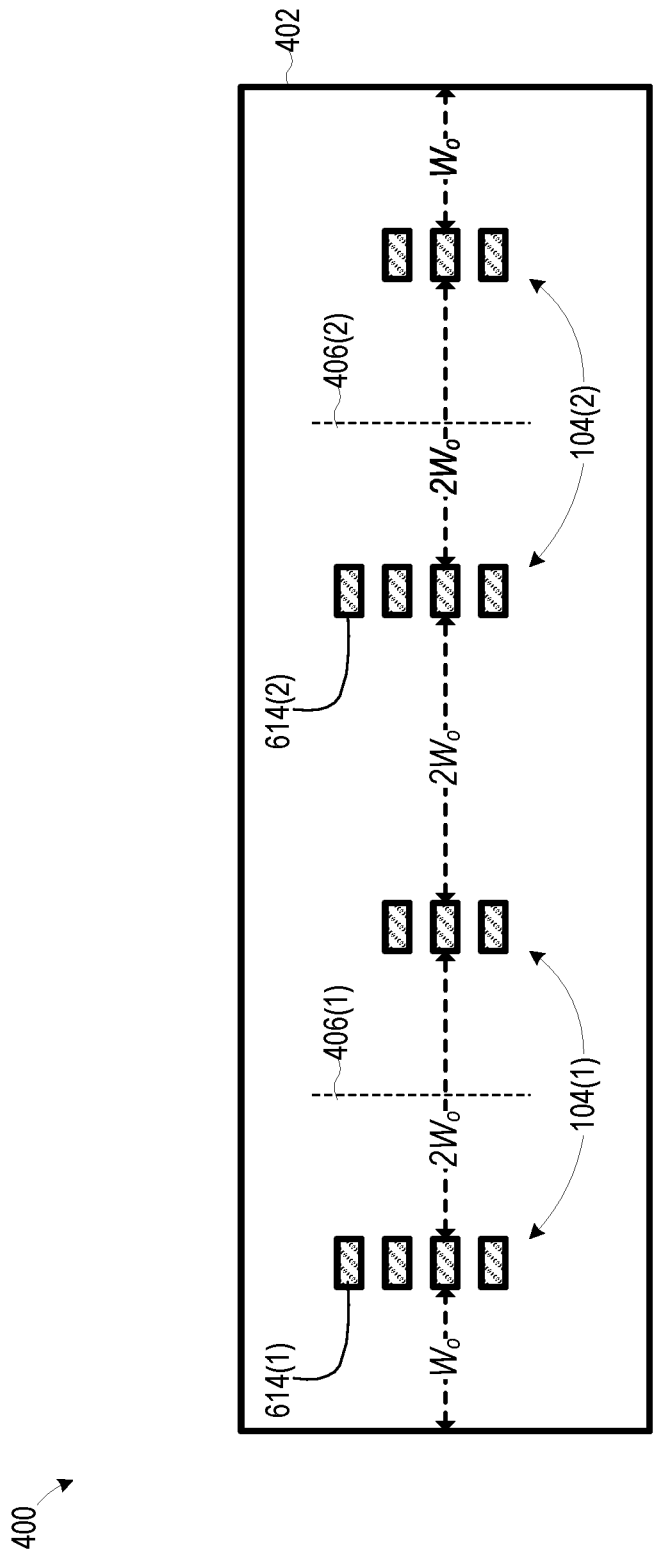
FIG. 5 is a cross-sectional view of the FIG. 4 inductor assembly, as seen when taken along line 5A-5A of FIG. 4.

Multiple discrete inductors have been co-packaged to form an inductor assembly including a plurality of discrete inductors. For example, FIGS. 4 and 5 collectively illustrate an example of conventional co-packaged discrete inductors. Specifically, FIG. 4 is a top plan view of an inductor assembly 400, and FIG. 5 is a cross-sectional view of inductor assembly 400, as seen when taken along line 5A-5A of FIG. 4. Inductor assembly 400 essentially consists of two discrete inductors 100 that are co-packaged. Accordingly, inductor assembly 400 includes a magnetic core 402 and a plurality of windings 104 embedded therein. Only the outline of magnetic core 402 is shown in FIG. 4 to enable windings 104 to be seen. Each winding 104 is wound around a respective winding axis 406 extending in the vertical direction. In this document, specific instances of an item may be referred to by use of a numeral in parentheses (e.g. winding 104(1)) while numerals without parentheses refer to any such item (e.g. windings 104).

Figure 6:
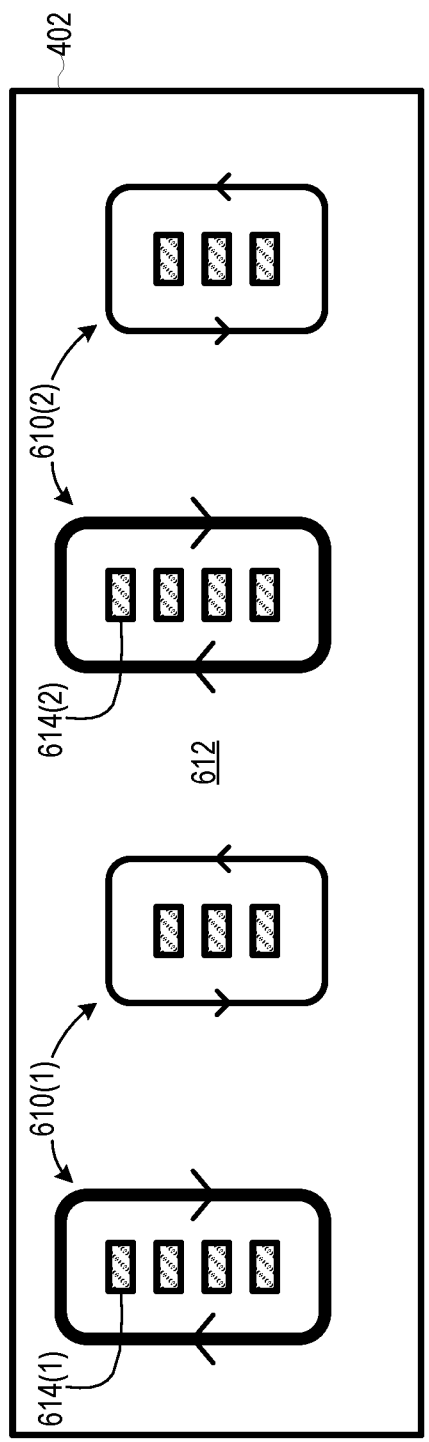
FIG. 6 is a cross-sectional view of the FIG. 4 inductor assembly that is marked up to show approximate magnetic flux paths.

Adjacent windings 104 must be separated from each other by a minimum distance 2 $W_o$ in magnetic core 402 to prevent saturation of the magnetic material between the windings, as well as to realize uniform magnetic core cross section for magnetic flux flowing within inductor assembly 400. Such total core area between the windings matches the sum of cross sections of individual inductors and ensures there is no derating of saturation properties with any directions of the current in the windings. FIG. 6 is a cross-sectional view of inductor assembly 400 that is like the FIG. 5 cross-sectional view, but that is marked up to show approximate magnetic flux paths within magnetic core 402. FIG. 6 assumes that a current $I_1$ flows into an end 408(1) of winding 104(1) and that a current $I_2$ flows into an end 408(2) of a winding 104(2), as illustrated in FIG. 4. Current $I_1$ generates magnetic flux 610(1), and current $I_2$ generates magnetic flux 610(2), as illustrated in FIG. 6. Each of magnetic fluxes 610(1) and 610(2) flows, in part, through a portion 612 of magnetic core 402 separating adjacent windings 104. Therefore, windings 104 must be significantly separated from each other to prevent saturation of the magnetic material between windings 104, or in other words, so that inductor assembly 400 implements two discrete inductors rated for the full targeted current. Consequently, inductor assembly 400 is not much smaller than two instances of discrete inductor 100; the only decrease in size achieved by using inductor assembly 400 in place of two discrete inductors 100 is elimination of separation distance d between discrete inductors 100.

Additionally, each winding 104 forms a fractional turn 614 on its left side, as shown in FIGS. 5 and 6. Fractional turns 614 cause magnetic flux density for each winding 104 to be stronger on its left side than on its right side, as symbolically shown in FIG. 6 by the lines illustrating magnetic fluxes 610 being thicker on the left sides of windings 104 than on the right sides of windings 104. This imbalance in magnetic flux intensity is undesirable because it decreases a saturation current rating of inductor assembly 400 and increases core losses in inductor assembly 400.

Disclosed herein are integrated inductor assemblies and associated systems and methods which at least partially overcome the above-discussed drawbacks of conventional co-packaged discrete inductors. The new integrated inductor assemblies implement multiple discrete inductors in a common package. However, in contrast to conventional co-packaged discrete inductors, the new integrated inductor assemblies and associated systems may be configured so that magnetic flux resulting from current flowing through inductor windings at least partially cancels in magnetic core portions between adjacent windings. For example, magnetic flux generated by current flowing through a first winding at least partially cancels magnetic flux generated by current flowing through an adjacent second winding, in a portion of the magnetic core separating the first and second windings. Therefore, windings of the new integrated inductor assemblies can be placed closer together than windings in conventional co-packaged discrete inductors, while still preventing material magnetic coupling between the windings. Additionally, certain embodiments are configured to reduce negative effects of magnetic flux imbalance resulting from fractional winding turns, thereby promoting high inductor saturation current rating and low magnetic core losses, or smaller inductor size.

Figure 7:
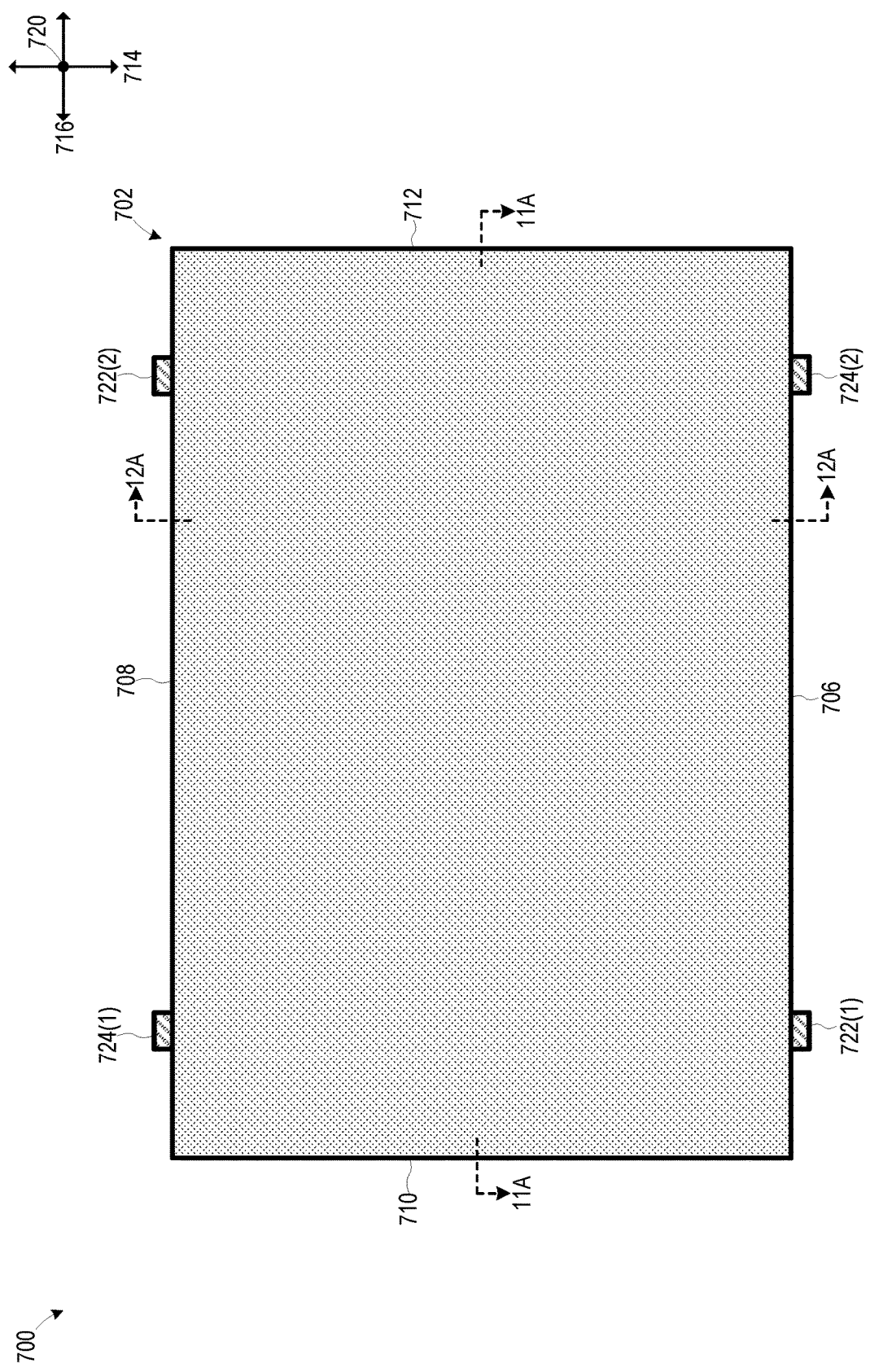
FIG. 7 is a top plan view of an integrated inductor assembly, according to an embodiment.
Figure 8:
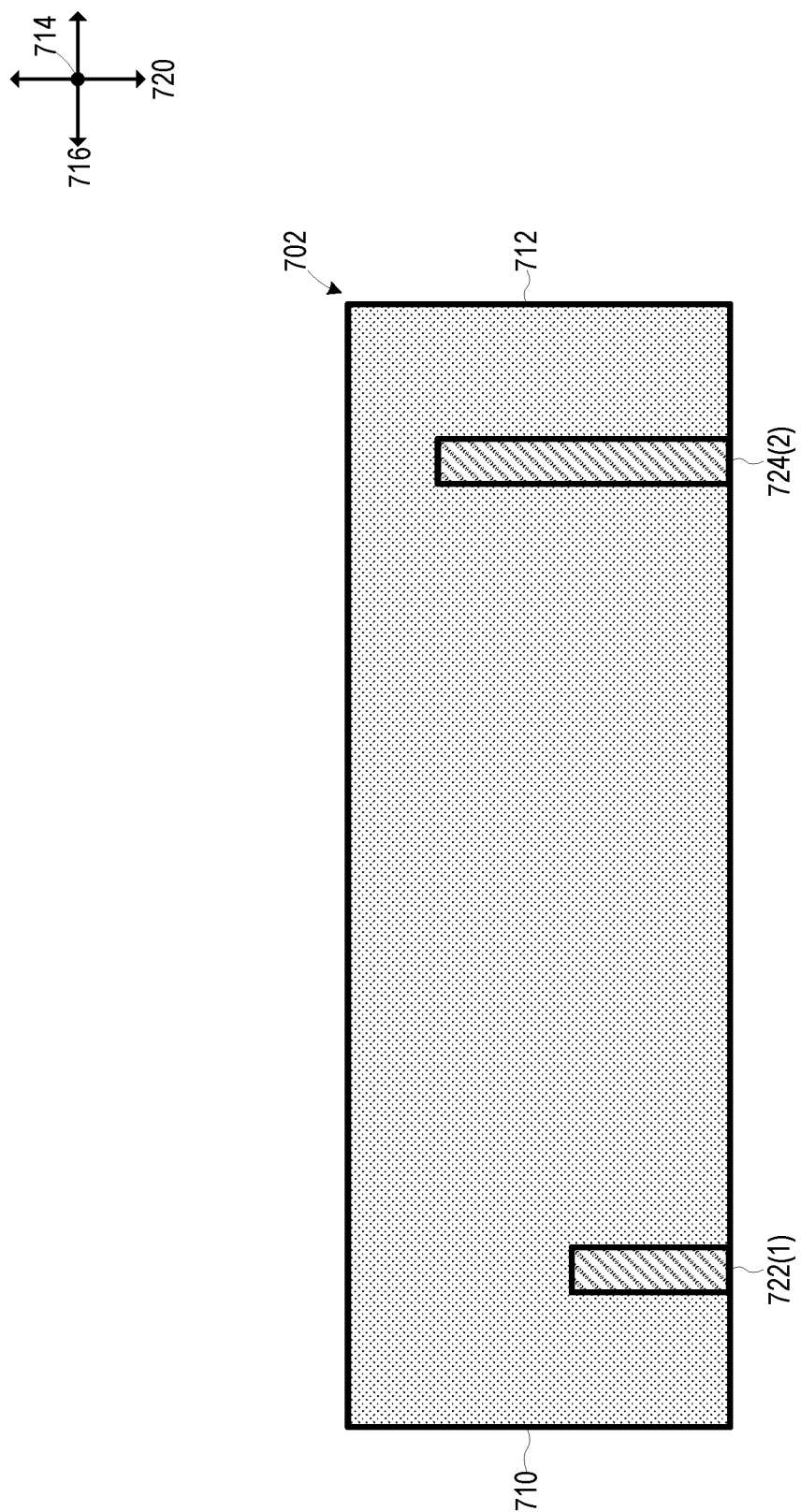
FIG. 8 is a front elevational view of the FIG. 7 integrated inductor assembly.
Figure 9:
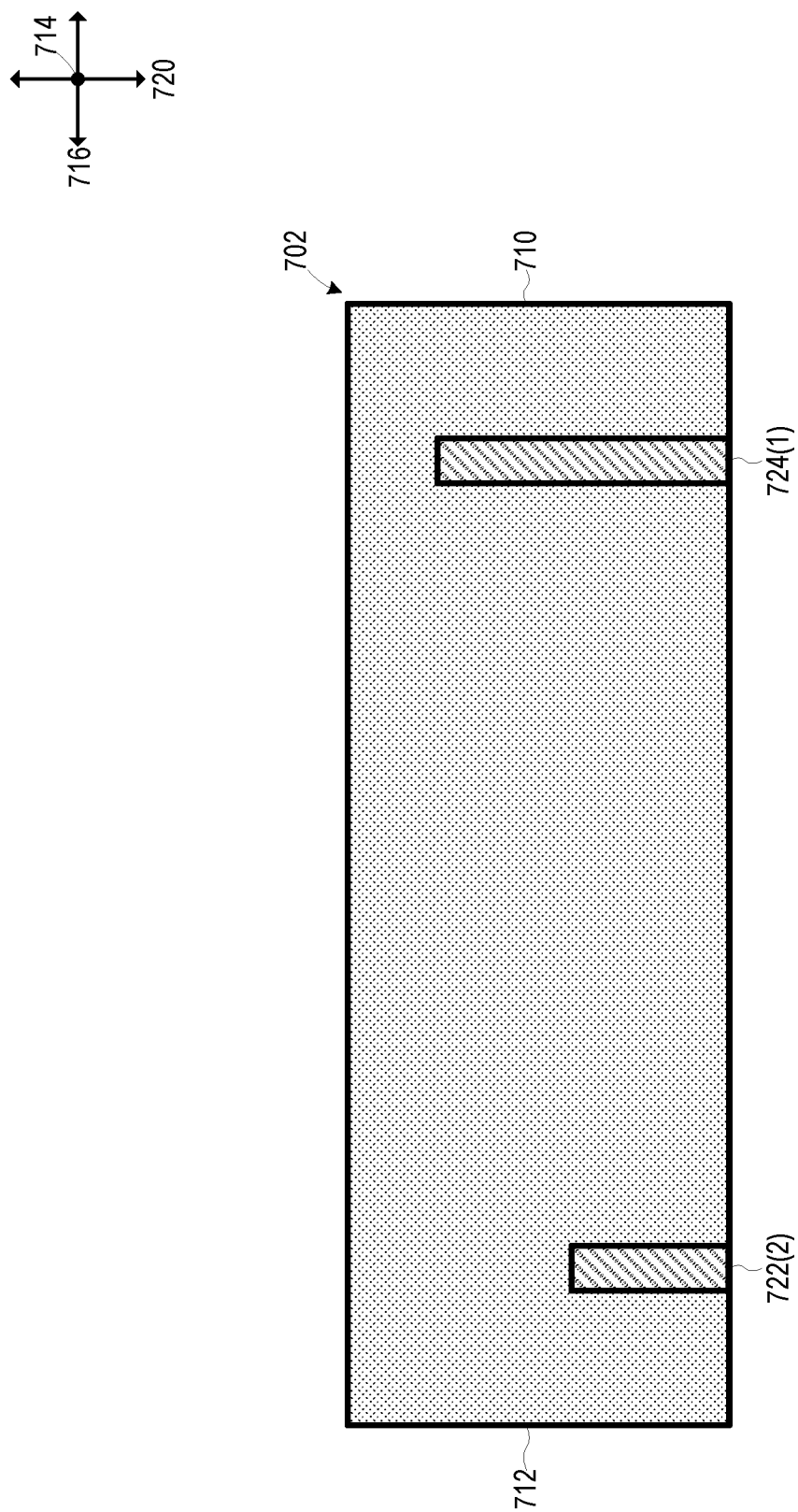
FIG. 9 is a back elevational view of the FIG. 7 integrated inductor assembly.
Figure 10:
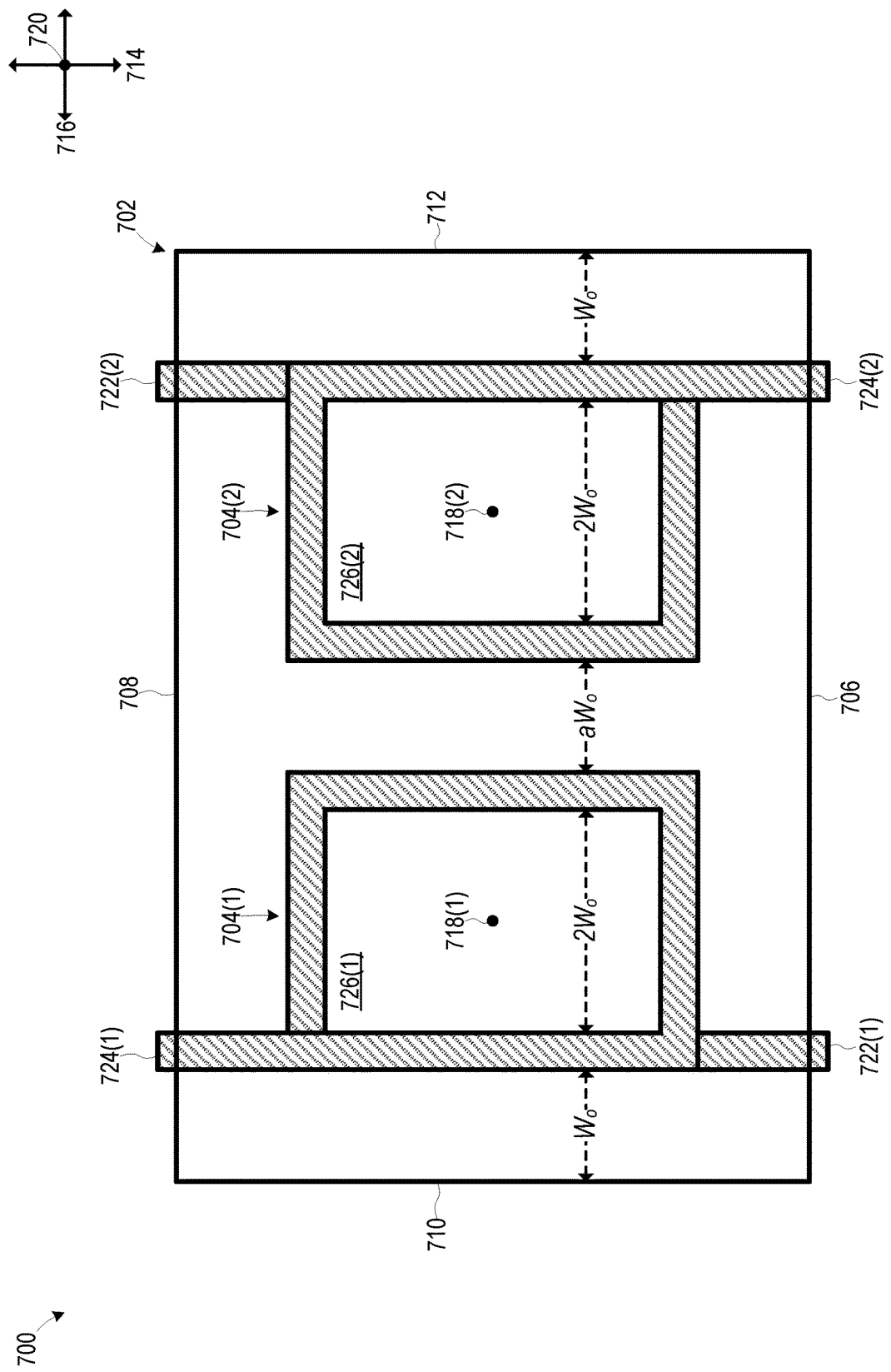
FIG. 10 is a top plan view of the FIG. 7 integrated inductor assembly, where a magnetic core of the integrated inductor assembly is shown in outline view.
Figure 11:
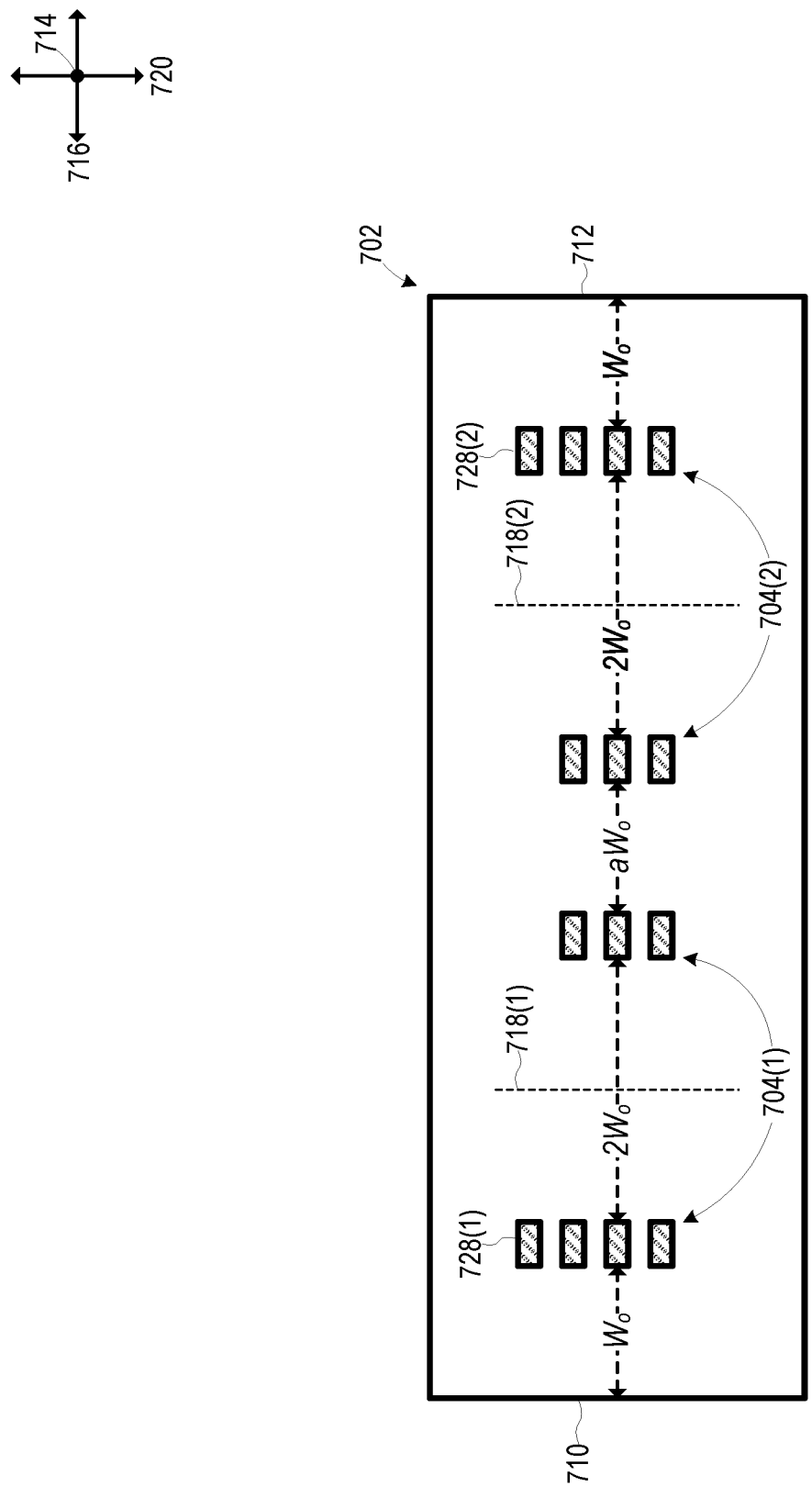
FIG. 11 is a cross-sectional view of the FIG. 7 integrated inductor assembly, as seen when taken along line 11A-11A of FIG. 7.
Figure 12:
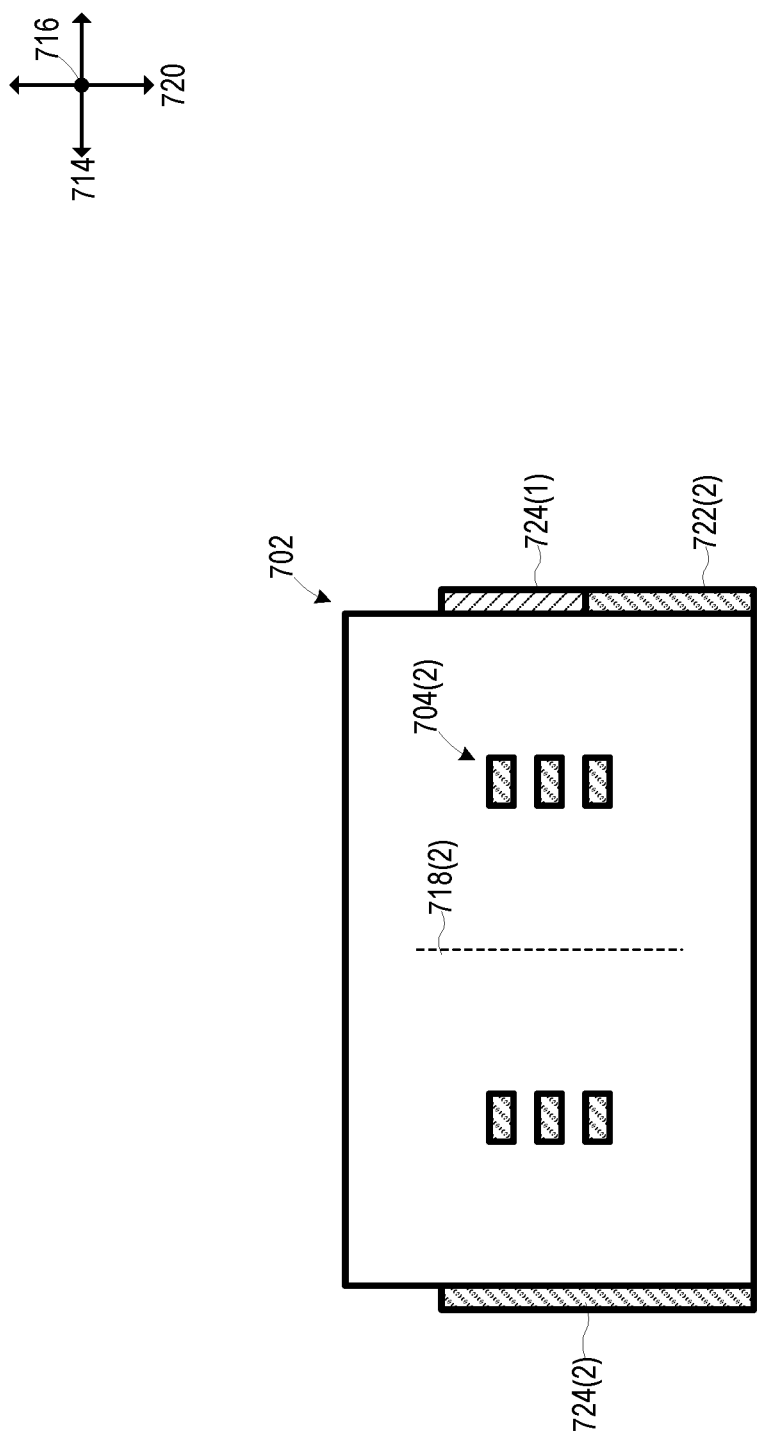
FIG. 12 is a cross-sectional view of the FIG. 7 integrated inductor assembly, as seen when taken along line 12A-12A of FIG. 7.

FIGS. 7-12 illustrate an integrated inductor assembly 700, which is one embodiment of the new integrated inductor assemblies disclosed herein. FIG. 7 is a top plan view of integrated inductor assembly 700, FIG. 8 is a front elevational view of integrated inductor assembly 700, and FIG. 9 is a back elevational view of integrated inductor assembly 700. FIG. 10 is a top plan view of integrated inductor assembly 700 where a magnetic core 702 of the integrated inductor assembly is shown in outline view, i.e. only the outline of magnetic core 702 is shown, to show windings 704 of the integrated inductor assembly. FIG. 11 is a cross-sectional view of integrated inductor assembly 700, as seen when taken along line 11A-11A of FIG. 7, and FIG. 12 is a cross-sectional view of integrated inductor assembly 700, as seen when taken along line 12A-12A of FIG. 7.

Integrated inductor assembly 700 includes magnetic core 702 and a plurality of windings 704 at least partially disposed therein. Magnetic core 702 includes a front side 706, a back side 708, a left side 710, and a right side 712. The terms front, back, left, and right are used herein solely for convenience and are not intended to require any particular orientation of integrated inductor assembly 700. For example, integrated inductor assembly 700 could be placed such that front side 706 faces upward. Front side 706 is separated from back side 708 in a direction 714, and left side 710 is separated from right side 712 in a direction 716, where direction 716 is orthogonal to direction 714. Magnetic core 702 is formed, for example, of a ferrite magnetic material or a mixture of a powder iron and binder. In some embodiments, magnetic core 702 is a homogenous magnetic core formed of a single material, while in some other embodiments, magnetic core 702 is a composite magnetic core formed of two of more different magnetic materials. Magnetic core 702 may be either a monolithic magnetic core, such as a magnetic core molded around windings 704, or a magnetic core formed of two or more elements that are joined together. Integrated inductor assembly 700 can also be implemented in multilayer film technology. For example, in particular embodiments, magnetic core 702 and windings 704 are formed by disposing multiple magnetic film layers and conductive film layers on a substrate.

Each winding 704 is at least partially wound around a respective winding axis 718 extending in a direction 720, where direction 720 is orthogonal to each of directions 714 and 716. Winding axes 718 are offset from each other in direction 716, and windings 704 are accordingly separated from each other in direction 716. The number of turns formed by each winding 704 may vary without departing from the scope hereof. For the best results, each winding 704 should have the same number of turns, but partial benefit is still realized with differing number of turns. Additionally, integrated inductor assembly 700 could be modified to include additional windings 704, such as discussed below with respect to FIGS. 19 and 20.

Each winding has a first end 722 and an opposing second end 724. In some embodiments, first ends 722 and/or second ends 724 include an element (not shown) for physically connecting to a PCB or other structure, such as a solder tab or a through-hole post. Although windings 704 are depicted as extending completely through integrated inductor assembly 700 in direction 714, windings 704 could alternately terminate before reaching front and back sides 706 and 708. For example, windings 704 could terminate on the bottom of magnetic core 702. The terminations could also be at or near the sides 710 and 712. Each winding 704 encloses a respective area 726, as seen when viewed cross-sectionally in direction 720 (see FIG. 10). Although areas 726 are illustrated as having a rectangular shape, windings 704 could be modified so that areas 726 have a different shape. For example, windings 704 could be modified to form rounded corners instead of rectangular corners, such that areas 726 have a rounded-rectangular shape. Windings 704 are illustrated as being formed of metallic foil, such as copper foil. However, windings 704 could be formed of other electrically conductive materials, such as single-strand wire or multi-strand wire (e.g. Litz wire).

Importantly, adjacent windings 704 have opposing orientations, as seen when viewed cross-sectionally in direction 720 (see, e.g. FIG. 10). For example, first end 722(1) of winding 704(1) terminates proximate to front side 706 of magnetic core 702, while first end 722(2) of winding 704(2) terminates proximate to back side 708 of magnetic core 702. Similarly, second end 724(1) of winding 704(1) terminates proximate to back side 708 of magnetic core 702, while second end 724(2) of winding 704(2) terminates proximate to front side 706 of magnetic core 702. Accordingly, while winding 704(2) has the same shape and size as winding 704(1), winding 704(2) is rotated by 180 degrees with respect to winding 704(1), as seen when windings 704 are viewed cross-sectionally in direction 720. Although it is generally desirable that winding 704(2) be rotated by 180 degrees with respect to winding 704(1) to maximize magnetic flux cancelation between adjacent windings (discussed below), winding 704(2) need only be rotated by substantially 180 degrees with respect to winding 704(1) to achieve significant magnetic flux cancelation. In this document, the term "substantially" means within plus or minus ten percent. For example, X is substantially equal to Y if X is at least 90% of Y and X is no more than 110% of Y.

Figure 13:
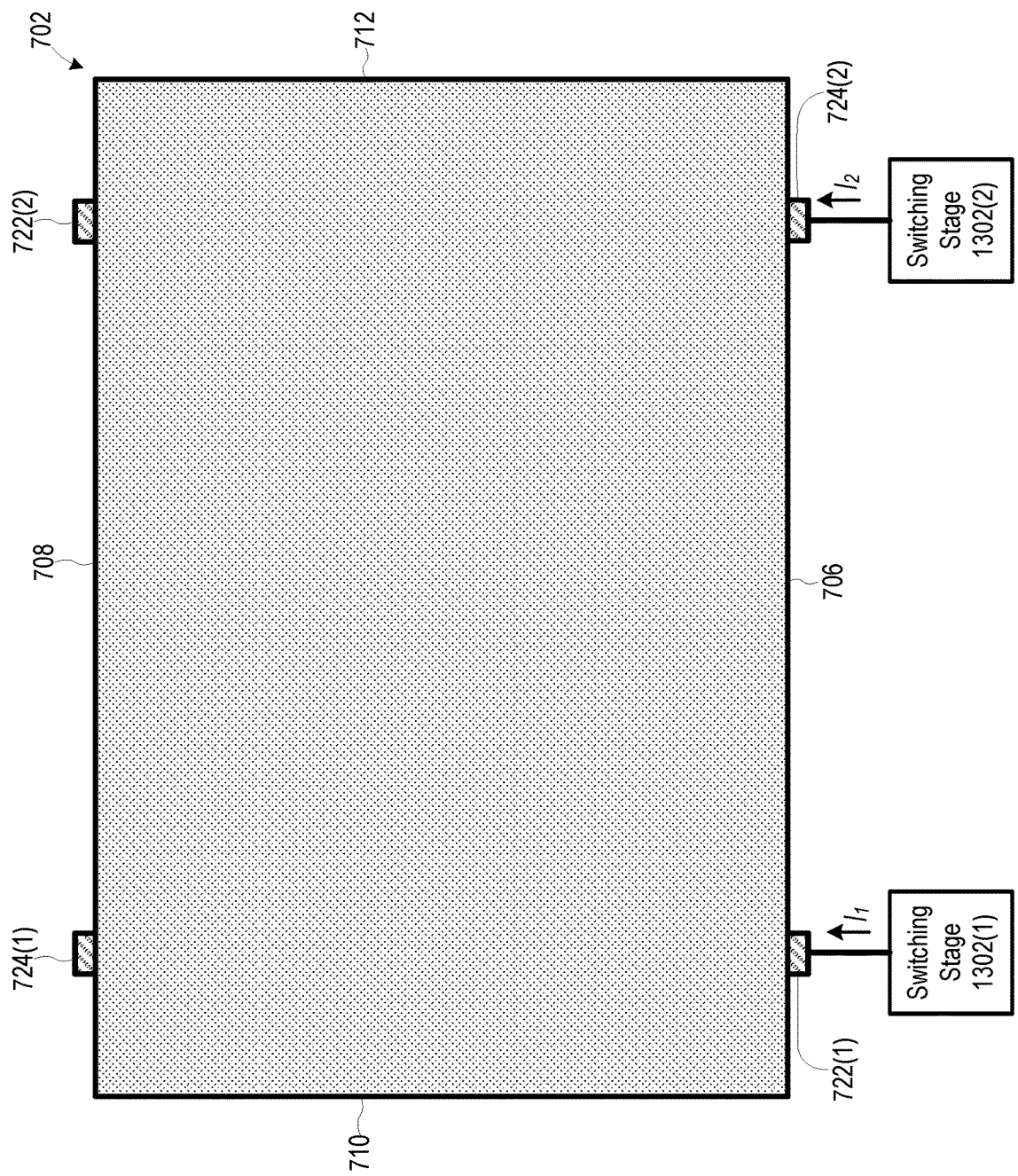
FIG. 13 is a top plan view illustrating one possible switching power converter application of the FIG. 7 integrated inductor assembly.

FIG. 13 is a top plan view illustrating one possible switching power converter application of integrated inductor assembly 700. In this example application, a respective switching stage 1302 for each winding 704 is disposed on a common side of integrated inductor assembly 700, i.e. proximate to front side 706 of magnetic core 702. Switching stage 1302(1) is electrically coupled to first end 722(1) of winding 704(1), and switching stage 1302(1) is configured to repeatedly switch first end 722(1) between at least two different power nodes (not shown). Switching stage 1302(2) is electrically coupled to second end 724(2) of winding 704(2), and switching stage 1302(2) is configured to repeatedly switch second end 724(2) between at least two different power nodes (not shown). An example possible configuration of switching stages 1302 is discussed below with respect to FIG. 33. Switching stages 1302 could alternately be disposed on the opposite side of integrated inductor assembly 700, i.e. proximate to back side 708 of magnetic core 702, with switching stages 1302(1) and 1302(2) being electrically coupled to second end 724(1) and first end 722(2), respectively.

Figure 14:
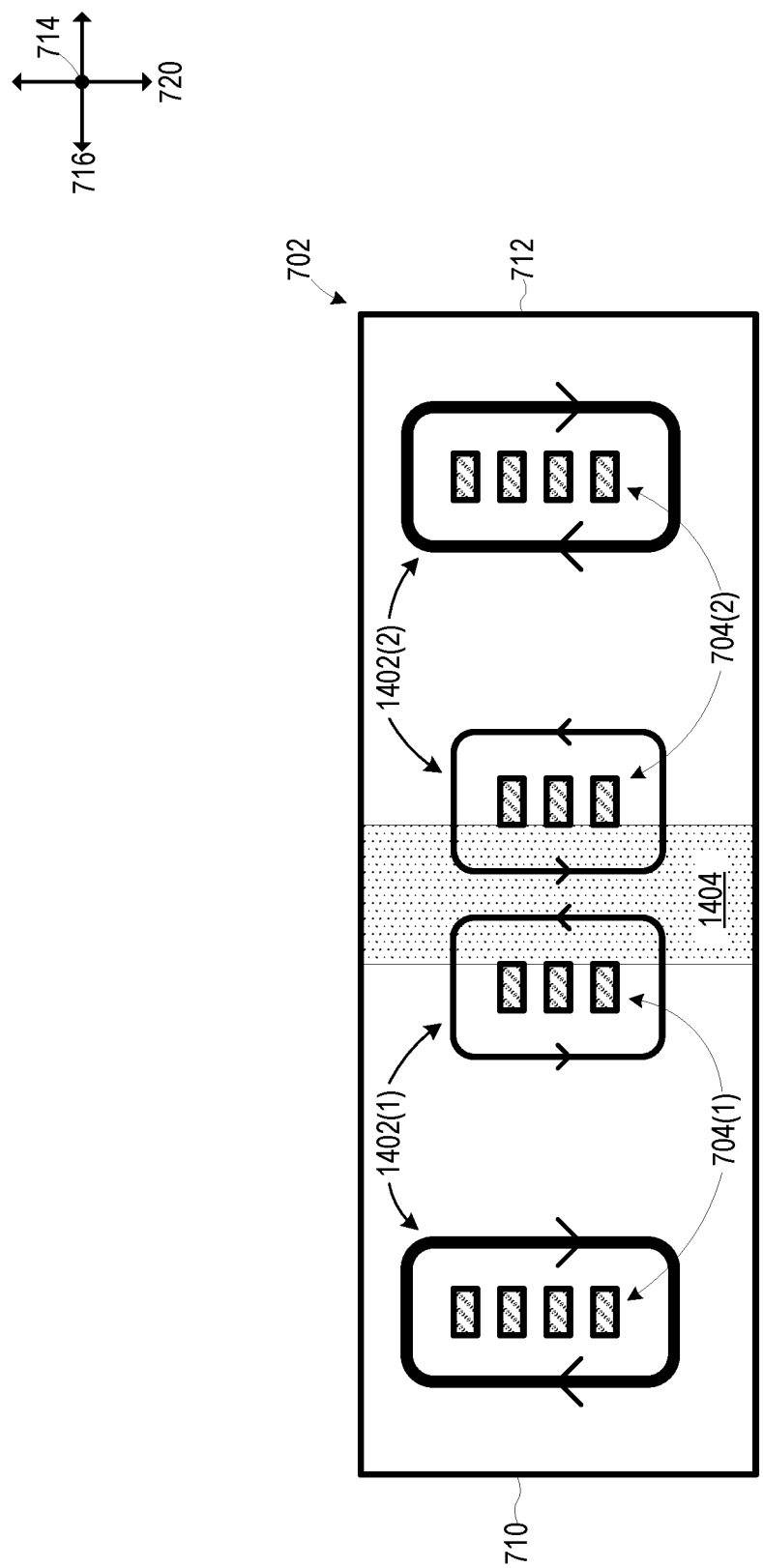
FIG. 14 is a cross-sectional view of the FIG. 7 integrated inductor assembly like that of FIG. 11 that is marked up to show approximate magnetic flux flow when the integrated inductor assembly is used in the FIG. 13 example application.

FIG. 14 is a cross-sectional view of integrated inductor assembly 700 like that of FIG. 11, but FIG. 14 is marked-up to show approximate magnetic flux flow in the example application depicted in FIG. 13. The fact that windings 704 have opposing orientations, as seen when viewed cross-sectionally in direction 720, advantageously helps minimize required separation between adjacent windings 704 in direction 716, when switching stages 1302 are disposed on a common side of integrated inductor assembly 700. In particular, a current $I_1$ flowing from the switching stage 1302(1) to end 722(1) of the winding 704(1) induces first magnetic flux 1402(1) in magnetic core 702. Additionally, a current $I_2$ flowing from the switching stage 1302(2) to end 724(2) of the winding 704(2) induces second magnetic flux 1402(2) in magnetic core 702. Importantly, second magnetic flux 1402(2) opposes first magnetic flux 1402(1) in a separation portion 1404 of magnetic core 702, i.e. first and second magnetic fluxes 1402(1) and 1402(2) flow in opposite respective directions in separation portion 1404. Separation portion 1404 of magnetic core 702 separates windings 704(1) and 704(2) in direction 716. The fact that second magnetic flux 1402(2) opposes first magnetic flux 1402(1) in separation portion 1404 helps reduce total magnetic flux between windings 704(1) and 704(2), thereby enabling the windings to be placed close together in direction 716 while still preventing saturation of the magnetic material between the windings. Indeed, if $I_1$ is equal to $I_2$, first and second magnetic fluxes 1402(1) and 1402(2) will completely cancel in separation portion 1404, which enables spacing between windings 704(1) and 704(2) to be essentially zero while still preventing material magnetic saturation of magnetic material between windings 704(1) and 704(2).

In typical applications, however, there is alternating current, as well as direct current, flowing through windings 704, which results in instantaneous current in windings 704 being unbalanced. Consequently, a non-zero separation distance between windings 704 in direction 716 is required to prevent saturation of the magnetic material between the windings. Additionally, direct current magnitude may be unequal in some applications. Accordingly, a separation distance between windings 704 in direction 716 is $aW_o$, as illustrated in FIG. 10, where a is less than or equal to one. In applications where current through windings 704 is largely balanced, a may be small, such as 0.25 or 0.50, thereby helping minimize size of integrated inductor assembly 700. In applications where current though windings 704 may be significantly unbalanced, a will need to be larger, such as 0.75, but no greater than one. In a worst case scenario where current through one winding 704 is at its maximum value and current through an adjacent winding 704 is zero, a will need to be equal to one to realize a uniform magnetic core cross section for magnetic flux without saturation. It should be appreciated, though, that windings 104 need to be separated by twice the distance, i.e. at least $2W_o$, in conventional inductor assembly 400, as illustrated in FIG. 5. Therefore, the configuration of integrated inductor assembly 700 enables significantly smaller minimum spacing between adjacent windings than conventional inductor assemblies, under even worst case conditions.

Thus, the configuration of integrated inductor assembly 700 enables windings 704 to be close together while still minimizing possibility of magnetic saturation in magnetic material between adjacent windings 704. Therefore, integrated inductor assembly 700 may be significantly smaller than conventional discrete inductors having similar inductance and saturation current ratings. This size decrease can be expressed by EQN. 1 below, where WI is width improvement (decrease in size in direction 716), N is number of inductors required, and d is minimum required separation distance between adjacent discrete inductors, such as illustrated in FIG. 3. As evident from EQN. 1, use of integrated inductor assembly 700 in place of conventional discrete inductors can achieve a significant saving in space occupied by inductors, especially in cases where a is small and/or many inductors are required.

$$WI = (N-1)(W_o(2-a)+d) \qquad \text{EQN. 1}$$

Winding 704(1) is separated from magnetic core side 710 in direction 716 by a separation distance $W_o$, and winding 704(2) is also separated from magnetic core side 712 in direction 716 by a separation distance $W_o$, as illustrated in FIG. 10. These separation distance values are chosen to achieve an approximately uniform magnetic core 702 cross-section for magnetic flux flowing through the magnetic core, in view of areas 726 having a relatively large aspect ratio. However, the separation distance values required to achieve uniform magnetic core 702 cross section will vary depending on geometry of areas 726. For example, the separation distance values may be smaller than $W_o$ if areas 726 are square instead of rectangular. Accordingly, values of separation distances between windings 704 and magnetic core sides 710 and 712 may vary without departing from the scope hereof.

Referring again to FIG. 11, each winding 704 forms a fractional turn 728, in addition to one or more complete turns, around a respective winding axis 718. As discussed above, fractional winding turns cause magnetic flux intensity imbalance, which decreases saturation current rating and increases core losses. Applicant has found, however, that negative effects of fractional winding turns 728 can be reduced by orienting windings 704 so fractional turns of two adjacent windings are adjacent each other.

Figure 15:
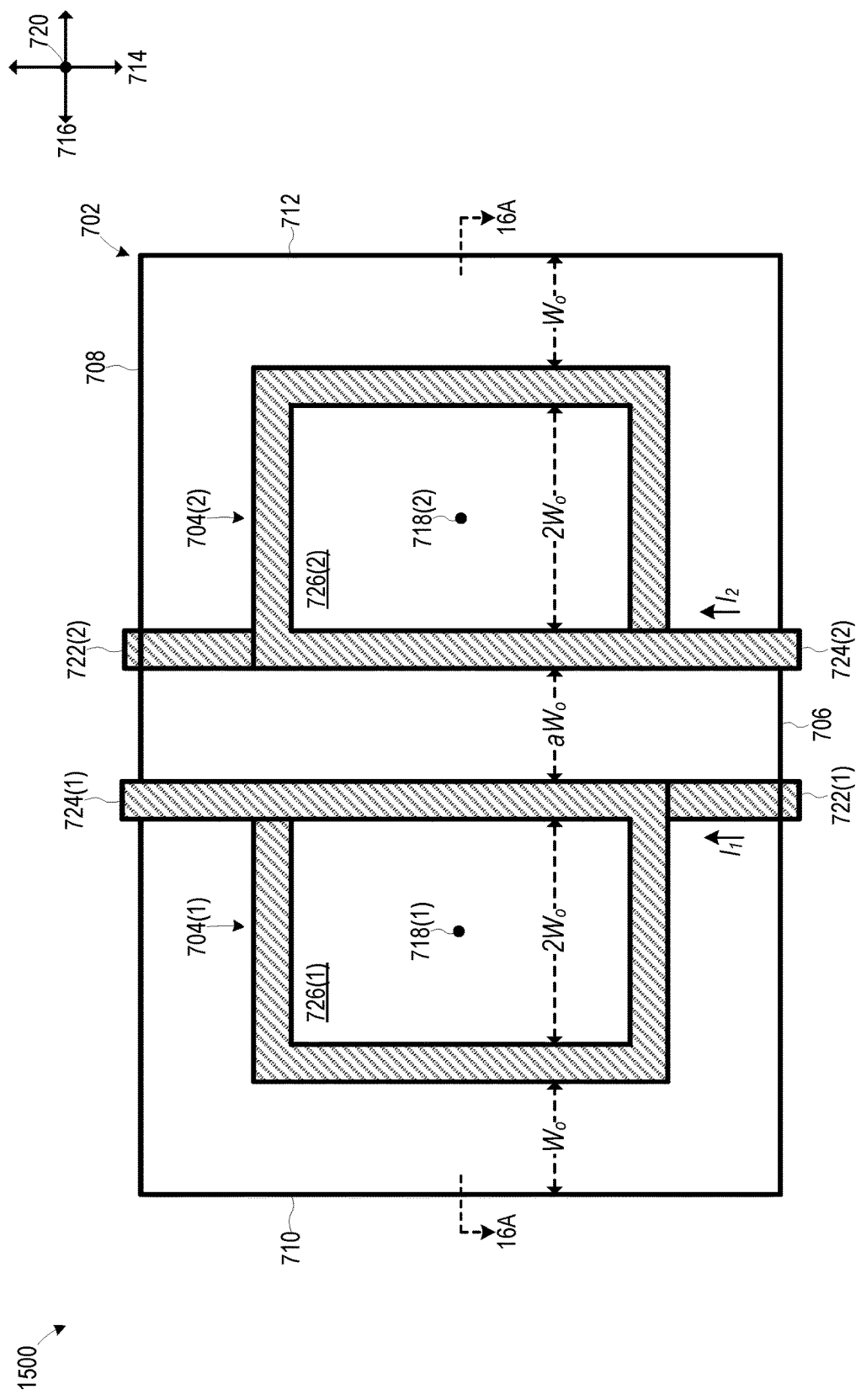
FIG. 15 is a top plan view of another integrated inductor assembly, according to an embodiment.
Figure 16:
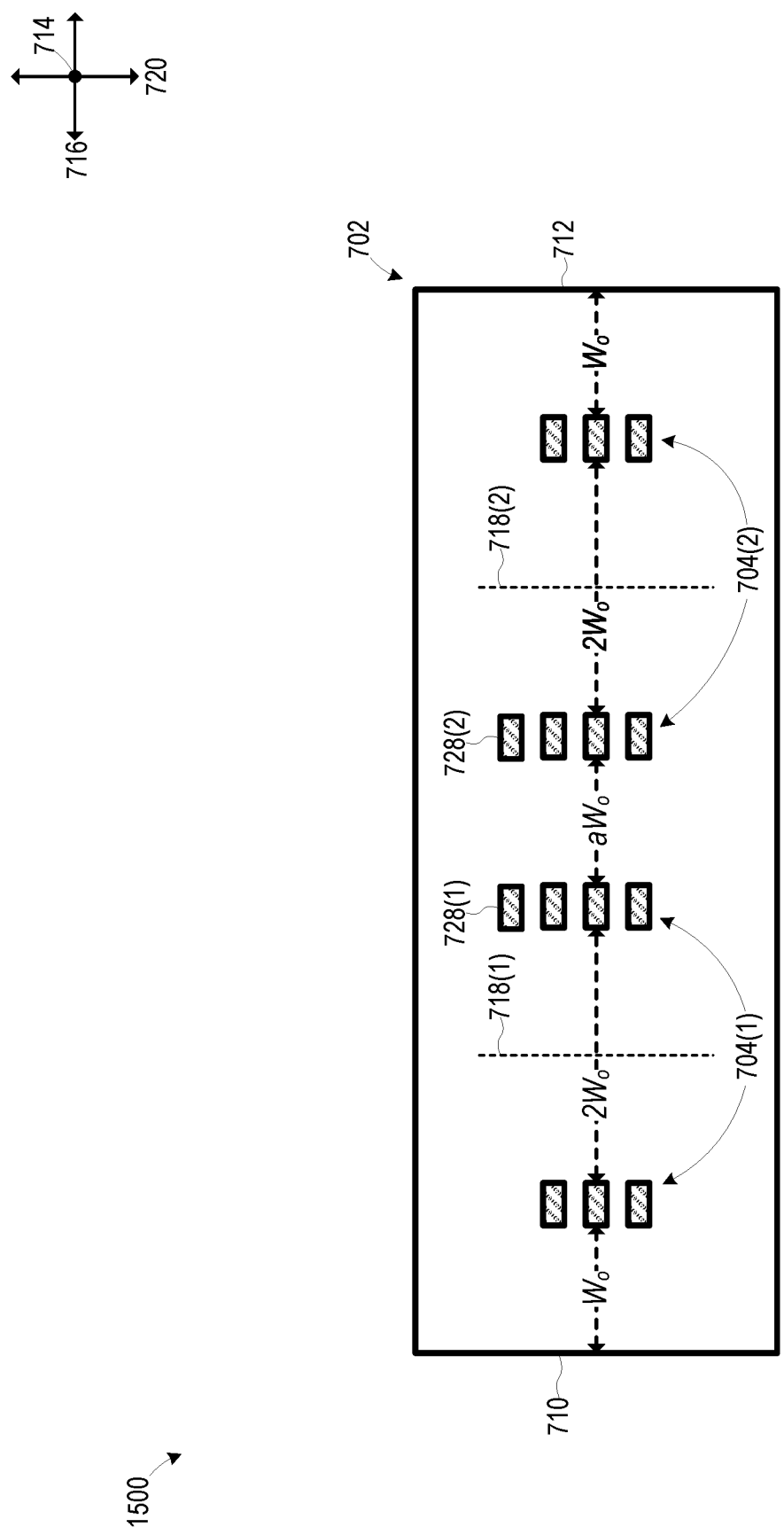
FIG. 16 is a cross-sectional view of the FIG. 15 integrated inductor assembly.
Figure 17:
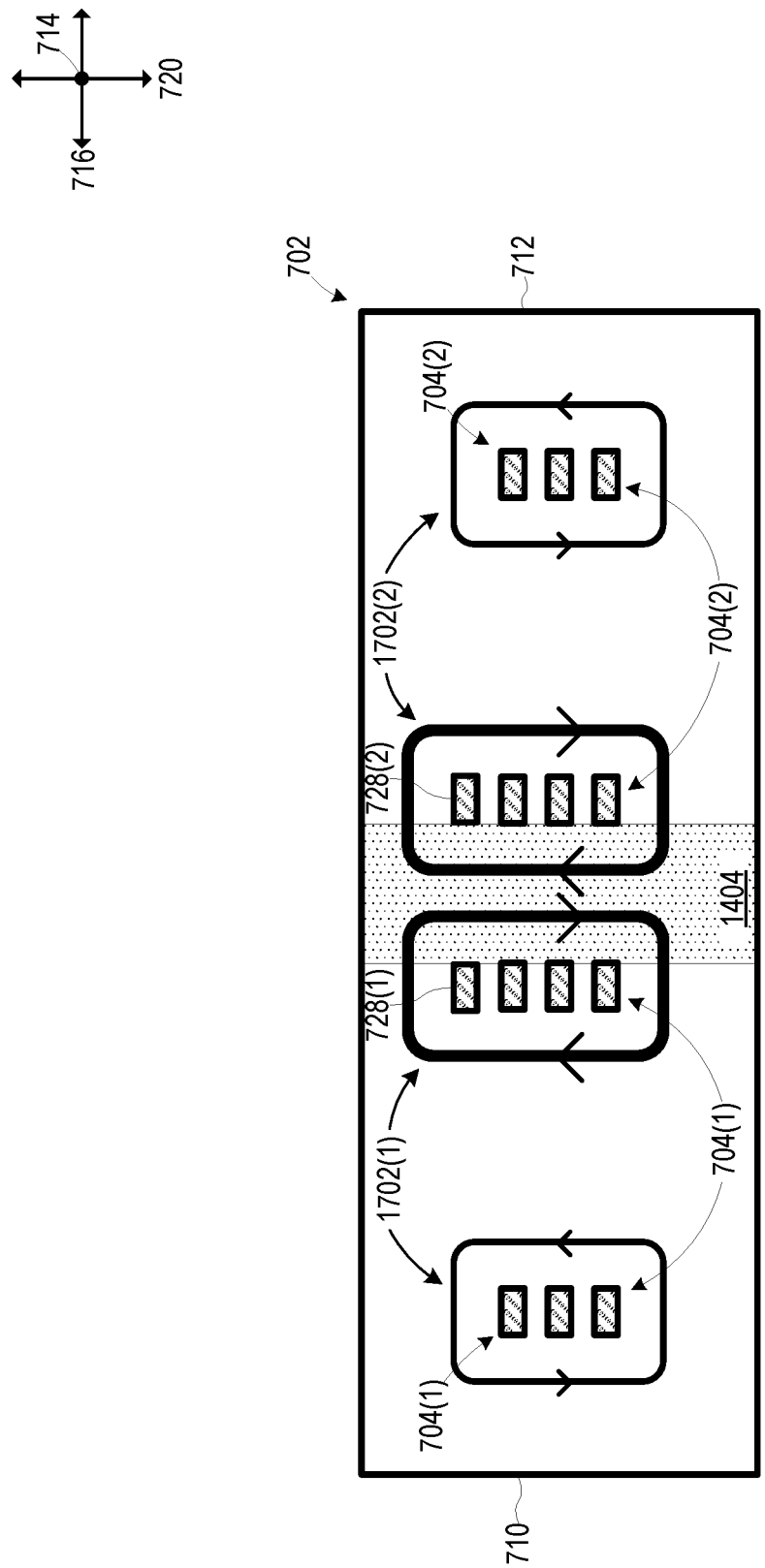
FIG. 17 is a cross-sectional view of the FIG. 15 integrated inductor assembly that is marked up to show approximate magnetic flux paths.

For example, FIG. 15 is a top plan view and FIG. 16 is a cross-sectional view analogous to FIGS. 10 and 11, respectively, of an integrated inductor assembly 1500. Magnetic core 702 is shown in outline view in FIG. 15, i.e. only its outline is shown, to enable windings 704 to be seen. The cross-section of FIG. 16 is taken along lines 16A-16A of FIG. 15. Integrated inductor assembly 1500 is an alternate embodiment of integrated inductor assembly 700 where windings 704 are each flipped such that (a) fractional turn 728(1) is located in a portion of winding 704(1) that is closest to winding 704(2) in direction 716, and (b) fractional turn 728(2) is located in a portion of winding 704(2) that is closest to winding 704(1) in direction 716, as illustrated in FIG. 16. Consequently, fractional turns 728 border separation portion 1404, as shown in FIG. 17, which is cross-sectional view like that of FIG. 16 but marked-up to show approximate magnetic flux paths. FIG. 17 assumes that direct currents $I_1$ and $I_2$ flow into winding ends 722(1) and 724(2), as illustrated in FIG. 15. Currents $I_1$ and $I_2$ are generated, for example, by respective switching stages (not shown) analogous to switching stages 1302 of FIG. 13 which are electrically coupled to winding ends 722(1) and 724(2).

Current $I_1$ induces first magnetic flux 1702(1) in magnetic core 702, and current $I_2$ induces second magnetic flux 1702(2) in magnetic core 702, as illustrated in FIG. 17. The fact that windings 704 have opposing orientations in integrated inductor assembly 1500, as seen when viewed cross-sectionally in direction 720, results in magnetic flux 1702(1) and 1702(2) opposing each other in separation portion 1404. Not only do these opposing magnetic fluxes in separation portion 1404 enable adjacent windings 704(1) and 704(2) to be close together without magnetic coupling, but they also help cancel large magnetic flux density associated with fractional turns 728. Thus, the winding configuration of integrated inductor assembly 1500 advantageously helps reduce negative effects associated with fractional winding turns, as well as helps minimize inductor size.

Figure 18:
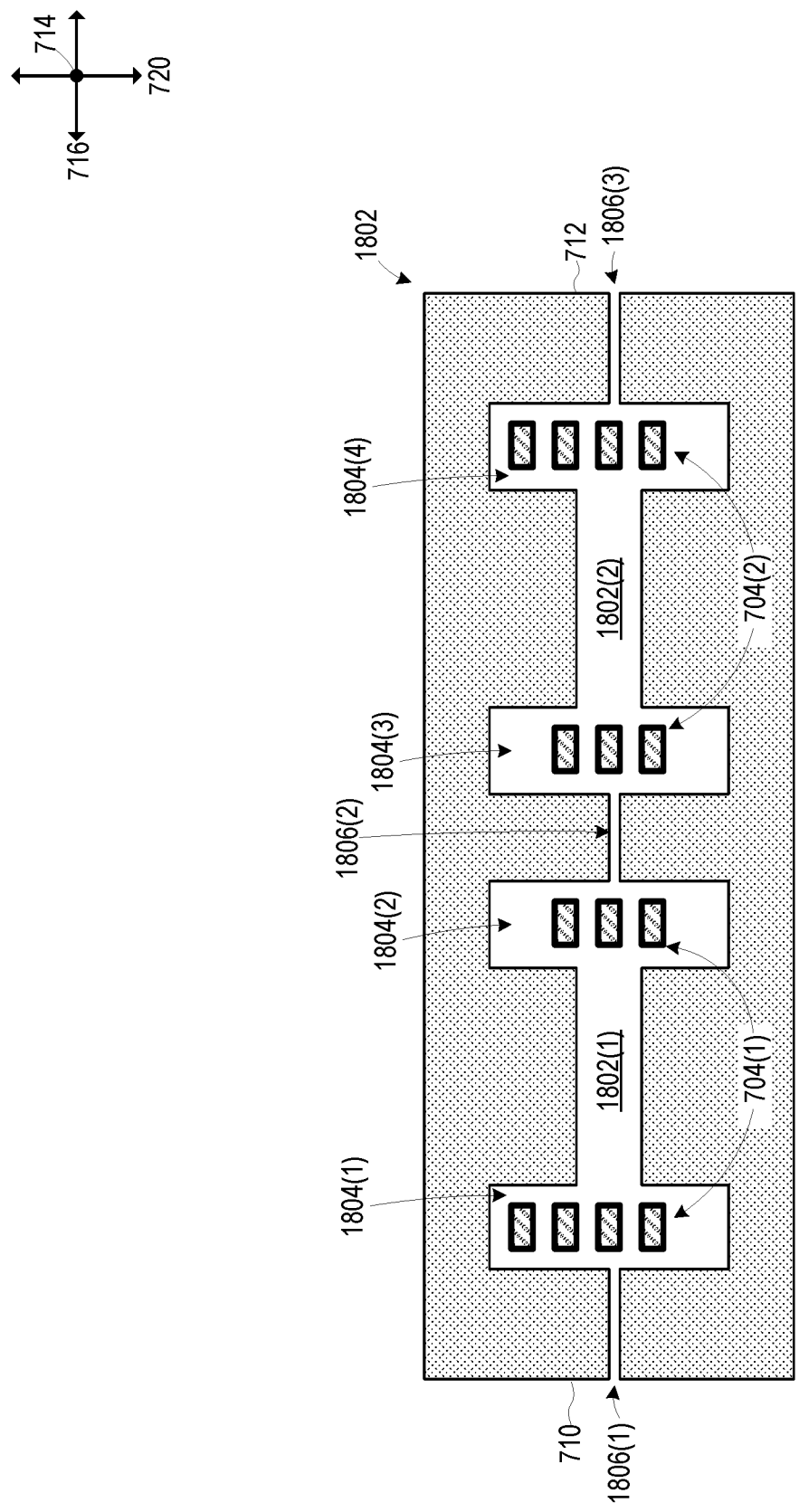
FIG. 18 is a cross-sectional view of an integrated inductor assembly including a magnetic core formed of a ferrite magnetic material, according to an embodiment.

Referring again to FIG. 7, magnetic core 702 will typically include one or more gaps, i.e. portions filled with non-magnetic material or magnetic material having relatively low permeability, to prevent magnetic saturation. Powder iron in a binder inherently forms a distributed gap. Thus, embodiments where magnetic core 702 is formed of powder iron in a binder will not necessarily form an explicit gap. However, in embodiments where magnetic core 702 is formed of a ferrite magnetic material, or another high-permeability magnetic material, magnetic core 702 will typically form one more respective gaps in the magnetic flux path of each winding 704, to help prevent magnetic saturation. For example, FIG. 18 is a cross-sectional view analogous to that of FIG. 11 of an embodiment of integrated inductor assembly 700 where magnetic core 702 is embodied by a magnetic core 1802 formed of a ferrite magnetic material. In the FIG. 18 embodiment, magnetic core 702 forms a respective gap 1802 in direction 720 in the magnetic flux path of each winding 704, as well as cut-outs 1804 for windings 704. Magnetic core 1802 optionally further forms gaps 1806 outside of windings 704. A thickness of gaps 1806 in direction 720 is significantly less than a thickness of gaps 1802 in direction 720 to help minimize magnetic coupling of windings 704.

Figure 19:
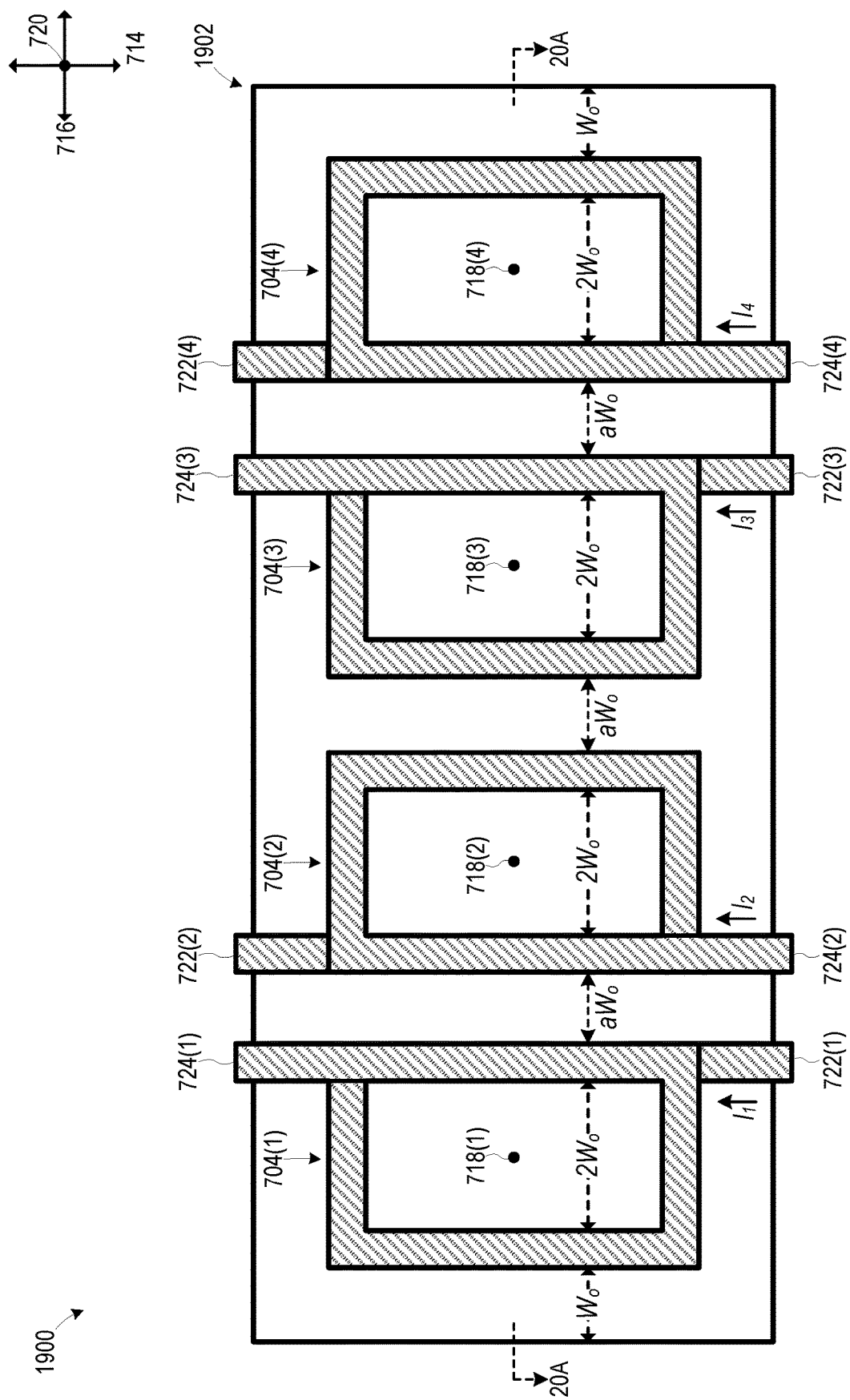
FIG. 19 is a top plan view of an integrated inductor assembly including four windings, according to an embodiment.
Figure 20:
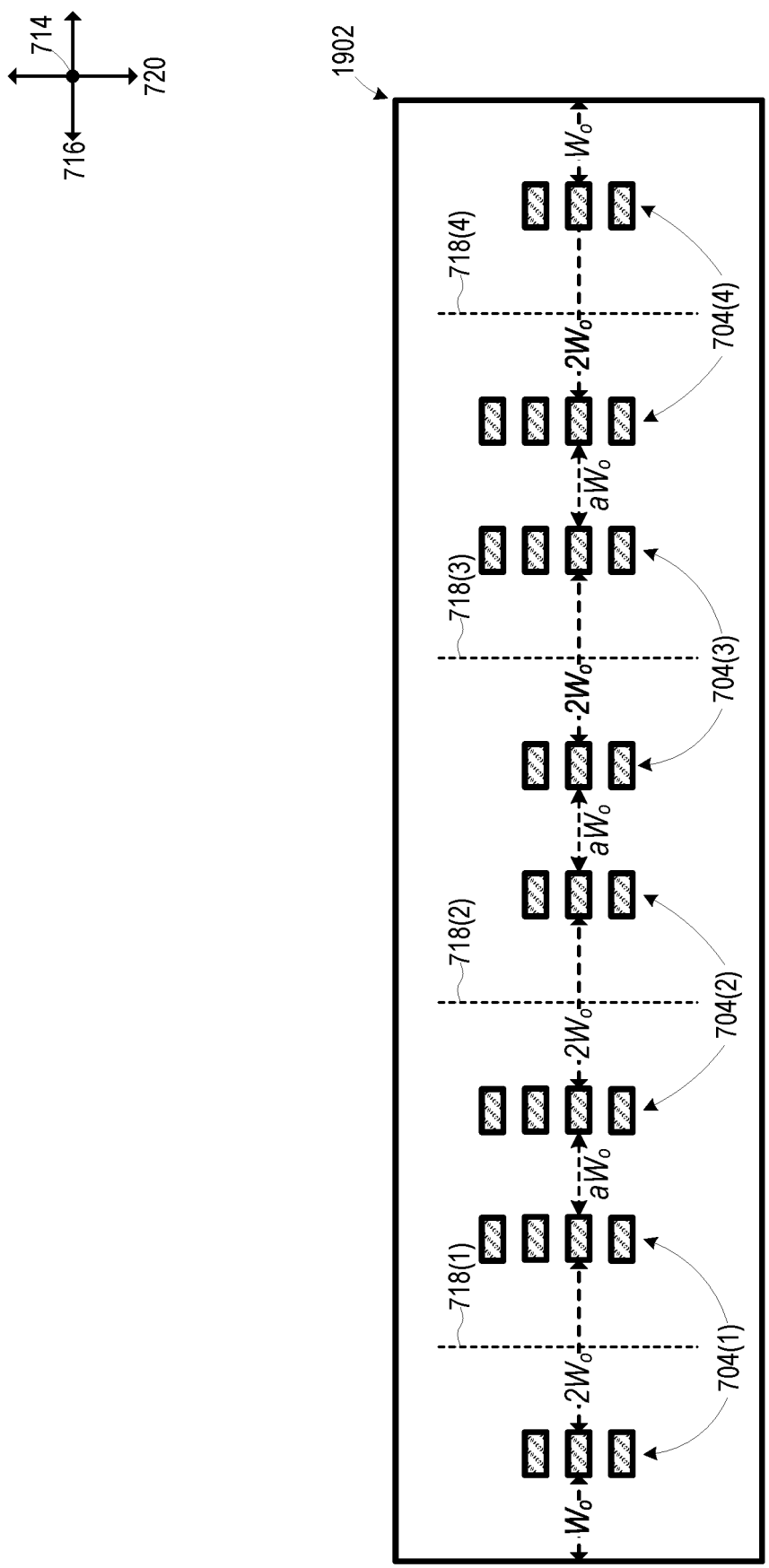
FIG. 20 is a cross-sectional view of the FIG. 19 integrated inductor assembly, according to an embodiment.

As discussed above, integrated inductor assembly 700 can be modified to include additional windings 704. For example, FIG. 19 is a top plan view and FIG. 20 is a cross-sectional view analogous to FIGS. 10 and 11, respectively, of an integrated inductor assembly 1900 including four windings 704. Magnetic core 1902 is shown in outline view in FIG. 19, i.e. only the outline of magnetic core 1902 is shown, to enable windings 704 to be seen. The cross-section of FIG. 20 is taken along lines 20A-20A of FIG. 19. Integrated inductor assembly 1900 includes a magnetic core 1902 in place of magnetic core 702. Magnetic core 1902 is like magnetic core 702, but magnetic core 1902 is longer than magnetic core 702 to accommodate two additional windings 704. Adjacent windings 704 have opposing orientations, as seen when viewed cross-sectionally in direction 720 in integrated inductor assembly 1900. Specifically, winding 704(2) is rotated by 180 degrees with respect to winding 704(1), winding 704(3) is rotated by 180 degrees with respect to winding 704(2), and winding 704(4) is rotated by 180 degrees with respect to winding 704(3), as seen when viewed cross-sectionally in direction 720. Accordingly, windings 704(1) and 704(3) have the same orientation, and windings 704(2) and 704(4) have the same orientation. The opposing orientation of adjacent windings 704 in integrated inductor assembly 1900 causes magnetic flux from adjacent windings to oppose each other in separation portions of magnetic core 1902 between adjacent windings.

Figure 21:
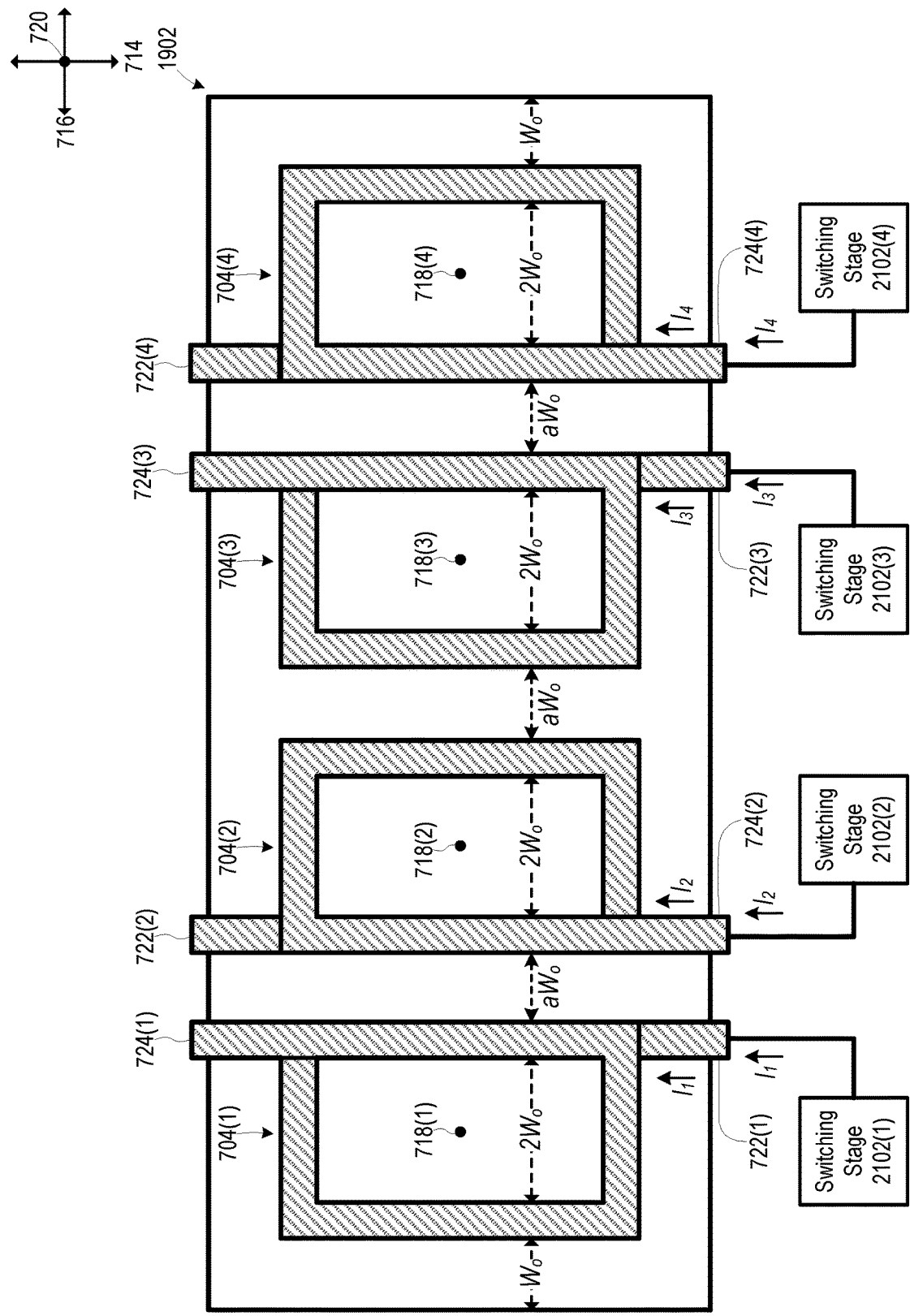
FIG. 21 is a top plan view illustrating one possible switching power converter application of the FIG. 19 integrated inductor assembly.

FIG. 21 is a top plan view illustrating one possible switching power converter application of integrated inductor assembly 1900. In this example application, a respective switching stage 2102 for each winding 704 is disposed on a common side of integrated inductor assembly 1900. Switching stage 2102(1) is electrically coupled to first end 722(1) of winding 704(1), and switching stage 2102(1) is configured to repeatedly switch first end 722(1) between at least two different power nodes (not shown). Switching stage 2102(2) is electrically coupled to second end 724(2) of winding 704(2), and switching stage 2102(2) is configured to repeatedly switch second end 724(2) between at least two different power nodes (not shown). Switching stage 2102(3) is electrically coupled to first end 722(3) of winding 704(3), and switching stage 2102(3) is configured to repeatedly switch first end 722(3) between at least two different power nodes (not shown). Switching stage 2102(4) is electrically coupled to second end 724(4) of winding 704(4), and switching stage 2102(4) is configured to repeatedly switch second end 724(4) between at least two different power nodes (not shown). An example possible configuration of switching stages 2102 is discussed below with respect to FIG. 33. Switching stages 2102 could alternately be disposed on the opposite side of integrated inductor assembly 1900 with switching stages 2102(1), 2102(2), 2103(3), and 2102(4) being electrically coupled to winding ends 724(1), 722(2), 724(3), and 722(4), respectively.

Figure 22:
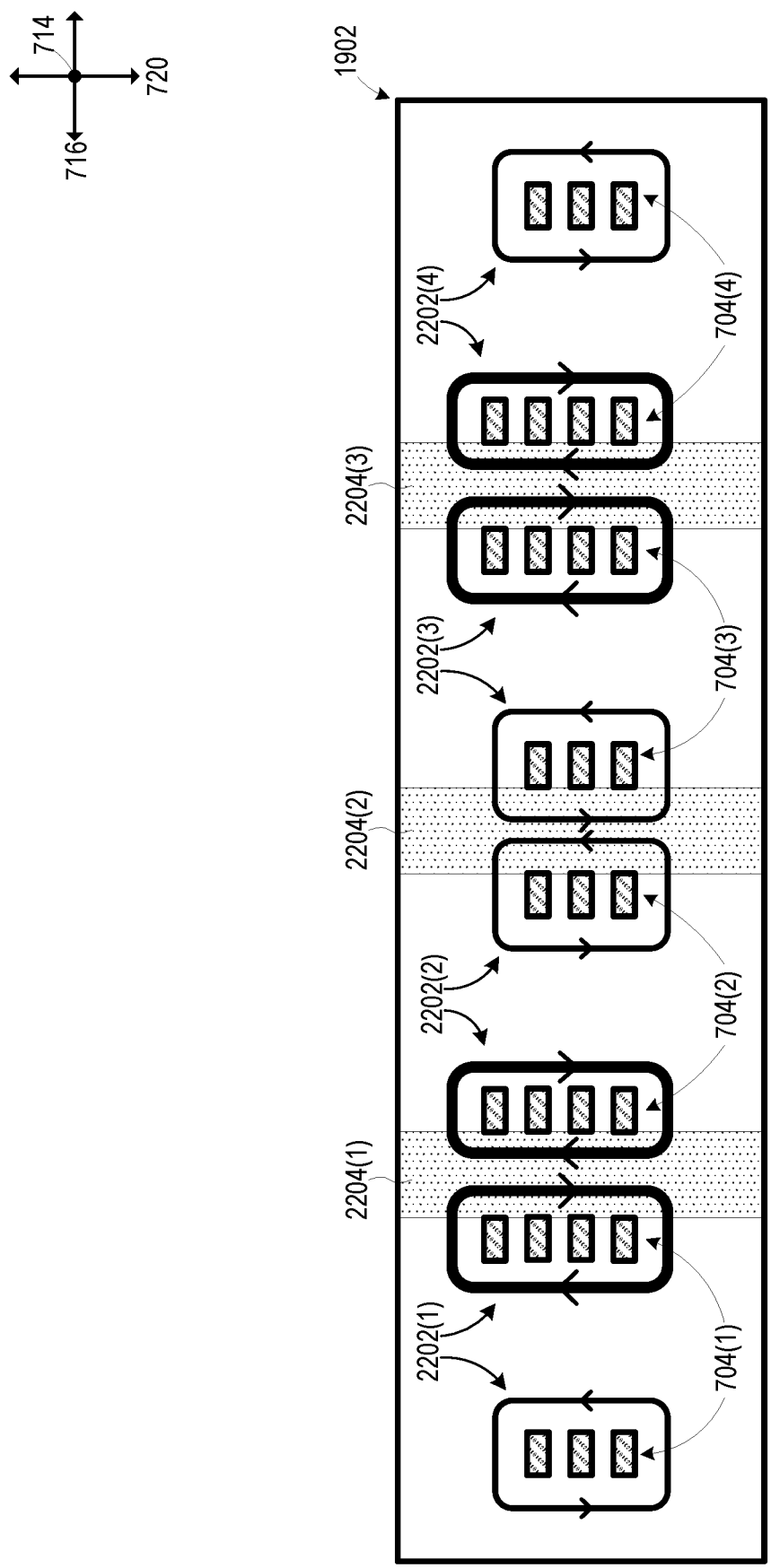
FIG. 22 is a cross-sectional view of the FIG. 19 integrated inductor assembly that is marked up to show approximate magnetic flux paths when the integrated inductor assembly is used in the FIG. 21 example application.

FIG. 22 is a cross-sectional view of integrated inductor assembly 1900 like that of FIG. 20, but FIG. 22 is marked-up to show approximate magnetic flux flow in the example application depicted in FIG. 21. The fact that windings 704 have opposing orientations, as seen when viewed cross-sectionally in direction 720, advantageously helps minimize required separation between adjacent windings 704 in direction 716, when switching stages 2102 are disposed on a common side of integrated inductor assembly 700. In particular, a current $I_1$ flowing from the switching stage 2102(1) to end 722(1) of the winding 704(1) induces first magnetic flux 2202(1) in magnetic core 1902. Additionally, a current $I_2$ flowing from the switching stage 2102(2) to end 724(2) of the winding 704(2) induces second magnetic flux 2202(2) in magnetic core 1902. Furthermore, a current $I_3$ flowing from the switching stage 2102(3) to end 722(3) of the winding 704(3) induces third magnetic flux 2202(3) in magnetic core 1902, and a current $I_4$ flowing from the switching stage 2102(4) to end 724(4) of the winding 704(4) induces fourth magnetic flux 2202(4) in magnetic core 1902.

As illustrated in FIG. 22, second magnetic flux 2202(2) opposes first magnetic flux 2202(1) in a separation portion 2204(1) of magnetic core 1902, third magnetic flux 2202(3) opposes second magnetic flux 2202(2) in a separation portion 2204(2) of magnetic core 1902, and fourth magnetic flux 2202(4) opposes third magnetic flux 2202(3) in a separation portion 2204(3) of magnetic core 1902. The fact that two magnetic fluxes 2202 oppose each other in each separation portion 2204 helps reduce possibility of magnetic saturation of magnetic material between windings 704, thereby enabling the windings to be placed close together in direction 716 without saturation of magnetic material between the windings. Accordingly, for reasons analogous to those discussed above with respect to integrated inductor assembly 700, a separation distance between windings 704 in direction 716 is $aW_o$, as illustrated in FIG. 20, where a is less than or equal to one. EQN. 1 above also applies to integrated inductor assembly 1900.

Figure 23:
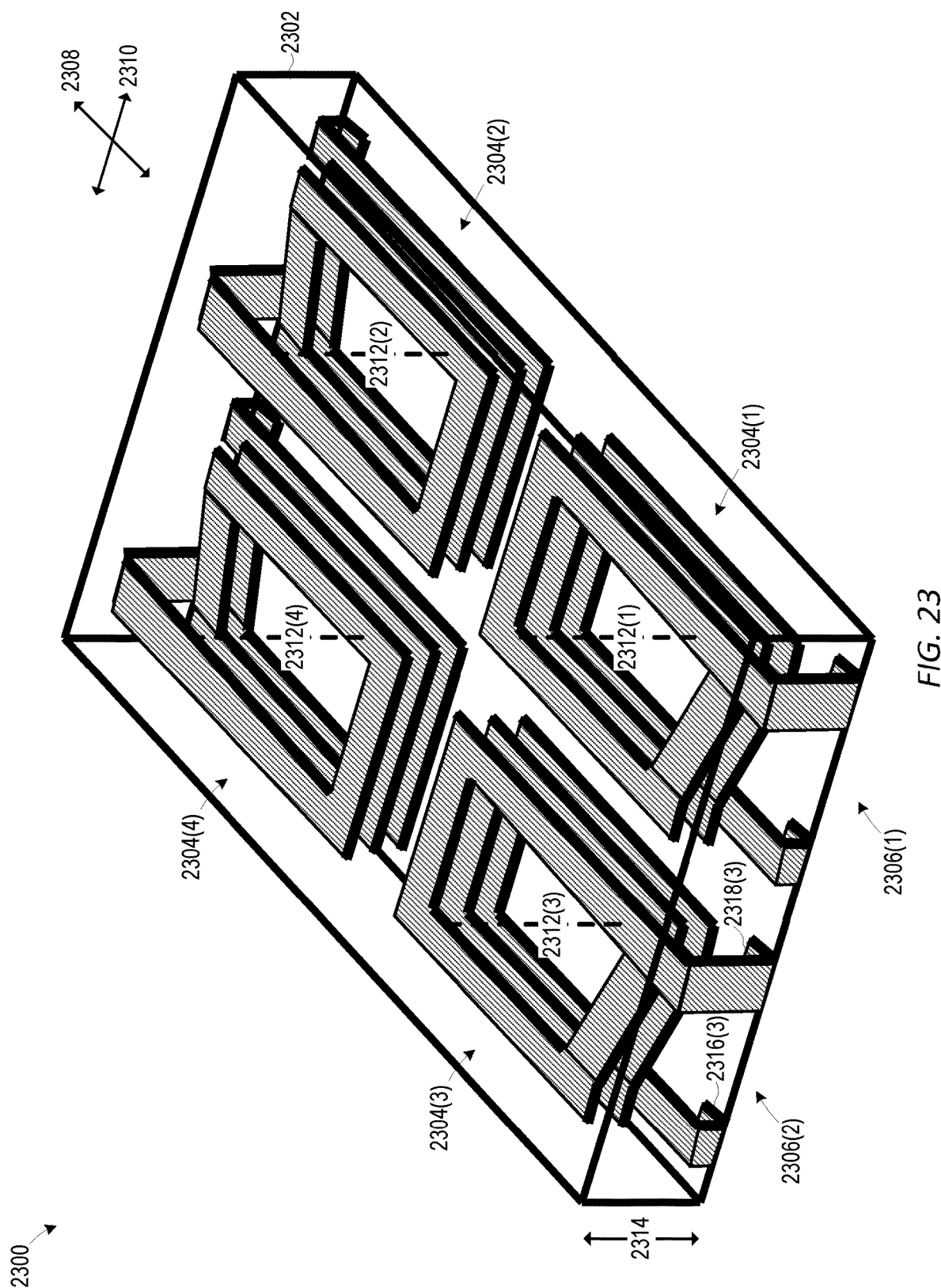
FIG. 23 is a perspective view of an integrated inductor assembly including a magnetic core and four windings collectively disposed in two rows, according to an embodiment.
Figure 24:
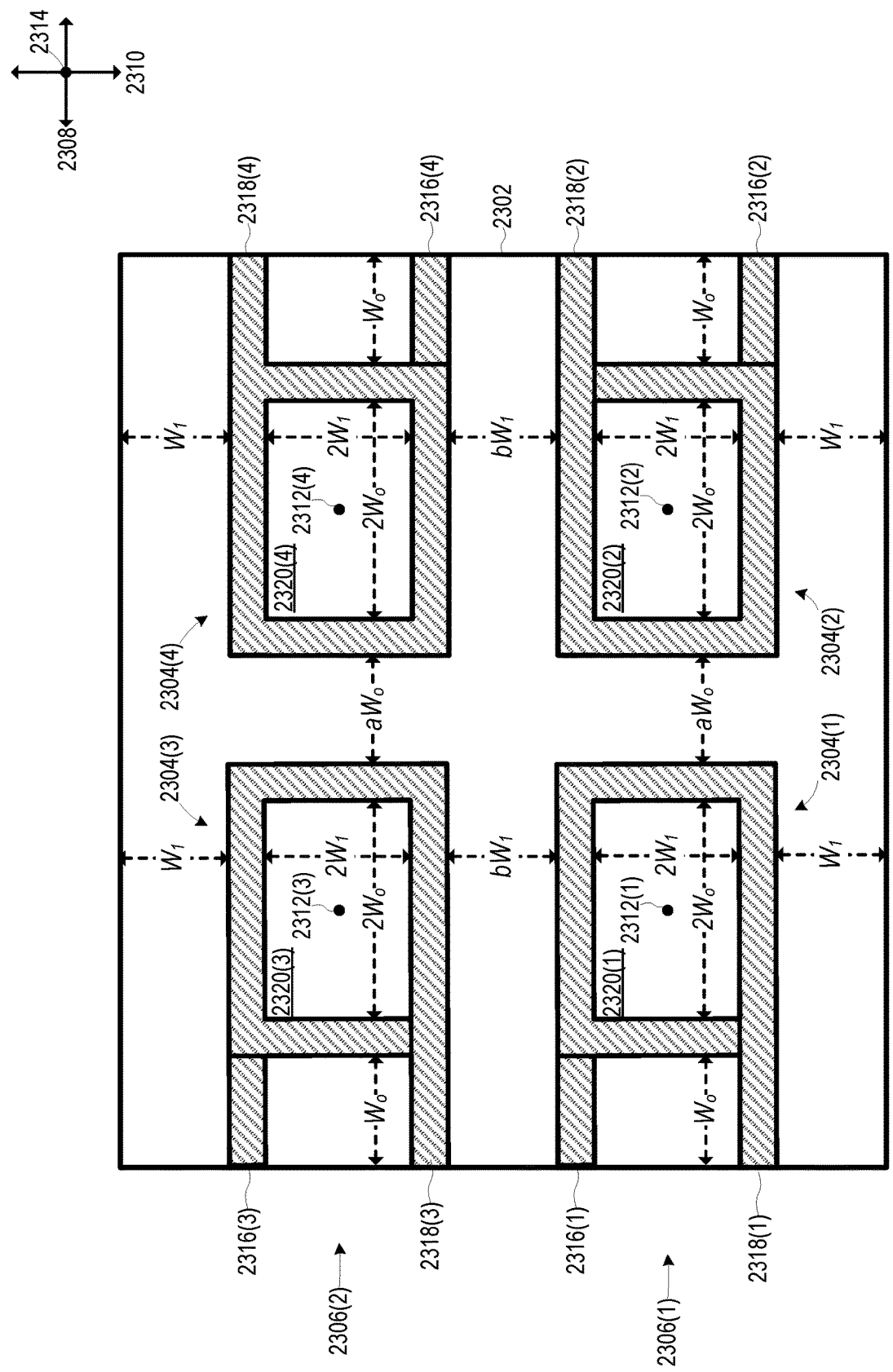
FIG. 24 is a top plan view of the FIG. 23 integrated inductor assembly.

The new integrated inductor assemblies discussed above could be modified to include two or more rows of windings, to create an array of co-packaged discrete inductors. For example, FIG. 23 is a perspective view of integrated inductor assembly 2300 including a magnetic core 2302 and four windings 2304 collectively disposed in two rows 2306. FIG. 24 is a top plane view of integrated inductor assembly 2300. Magnetic core 2302 is shown in outline view in FIGS. 23 and 24, i.e. only the outline of magnetic core 2302 is shown, so that windings 2304 can be seen. Magnetic core 2302 is formed, for example, of a ferrite magnetic material or a mixture of a powder iron and binder. In some embodiments, magnetic core 2302 is a homogenous magnetic core formed of a single material, while in some other embodiments, magnetic core 2302 is a composite magnetic core formed of two of more different magnetic materials. Magnetic core 2302 may be either a monolithic magnetic core, such as a magnetic core molded around windings 2304, or a magnetic core formed of two or more elements that are joined together. Magnetic core 2302 may also be formed using multilayer film technology, such as discussed above with respect to magnetic core 702.

Each winding 2304 is at least partially disposed in magnetic core 2302. Windings 2304(1) and 2304(2) are disposed in row 2306(1), and windings 2304(3) and 2304(4) are disposed in row 2306(2). Windings 2304 within a given row 2306 are separated from each other in a direction 2308, and rows 2306 are separated from each other in a direction 2310, where direction 2310 is orthogonal to direction 2308. Consequently, windings 2304(1) and 2304(3) are separated from each other in direction 2310, and windings 2304(2) and 2304(4) are separated from each other in direction 2310. Each winding 2304 is at least partially wound around a respective winding axis 2312 extending in a direction 2314, where direction 2314 is orthogonal to each of directions 2308 and 2310. Winding axes 2312 are offset from each other in directions 2308 and 2310. The number of turns formed by each winding 2304 may vary without departing from the scope hereof, and each winding 2304 need not form the same number of turns. Additionally, integrated inductor assembly 2300 could be modified to include additional windings 2304, such as by adding windings 2304 to rows 2306 and/or by adding rows 2306 to integrated inductor assembly 2300.

Each winding has a first end 2316 and an opposing second end 2318. Ends 2316 and 2318 are only labeled on only one winding 2304 in FIG. 23, i.e. on winding 2304(3), for illustrative clarity. Each winding end 2316 and 2318 is labeled in FIG. 24, though. Each winding end 2316 and 2318 forms a respective solder tab, although windings 2304 could be modified so that ends 2316 and 2318 form a different structure for physically connecting to a PCB, such as a through-hole post. Additionally, winding ends 2316 and 2318 could be modified to terminate in different locations, such as on the bottom of magnetic core 2302 instead of on the sides of magnetic core 2302. The windings can also terminate on different sides of the inductor, for example, winding 2312(1) can have terminations on different side as compared to 2312(3). Each winding 2304 encloses a respective area 2320 having a rectangular shape, as seen when viewed in direction 2314. However, windings 2304 could be modified to enclose areas 2320 having a different shape, such as a rounded-rectangular shape. Windings 2304 are illustrated as being formed of metallic foil, such as copper foil. However, windings 2304 could be formed of other electrically conductive materials, such as single-strand wire or multi-strand wire.

Adjacent windings 2304 in a given row 2306 have opposing orientations, as seen when viewed in direction 2314. For example, winding 2304(2) has the same shape and size as winding 2304(1), but winding 2304(2) is rotated by 180 degrees with respect to winding 2304(1), as seen when viewed in direction 2314. While it is generally desirable that adjacent windings 2304 within a given row 2306 be rotated by 180 degrees with respect to each other to maximize magnetic flux cancelation between adjacent windings, adjacent windings 2304 need only be rotated by substantially 180 degrees with respect to each other, to achieve significant magnetic flux cancelation.

Figure 25:
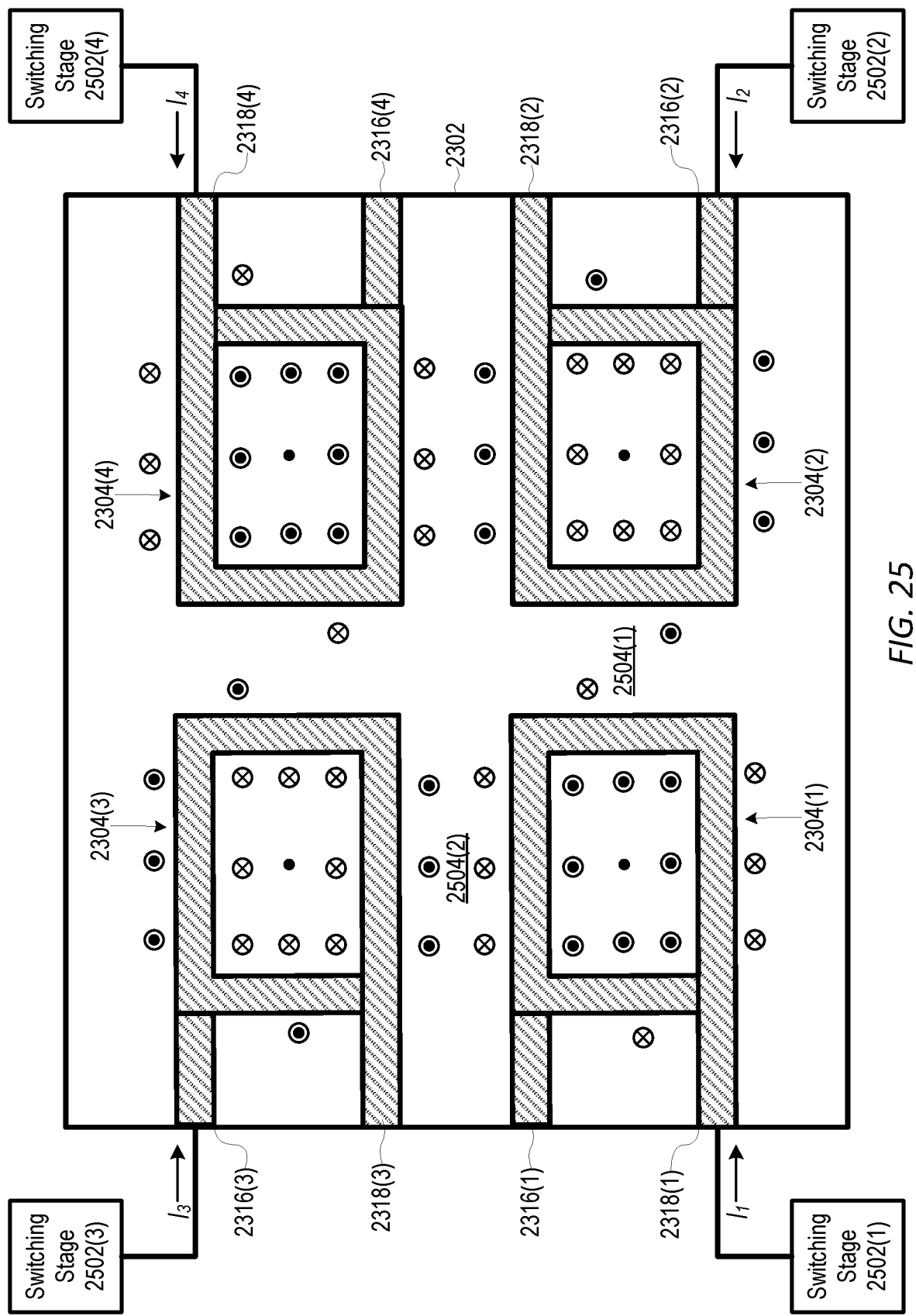
FIG. 25 is a top plan view illustrating one possible switching power converter application of the FIG. 23 integrated inductor assembly.

FIG. 25 is a top plan view illustrating one possible switching power converter application of integrated inductor assembly 2300, where a respective switching stage 2502 is electrically coupled to each winding 2304. Switching stage 2502(1) is electrically coupled to second end 2318(1) of winding 2304(1), switching stage 2502(2) is electrically coupled to first end 2316(2) of winding 2304(2), switching stage 2502(3) is electrically coupled to first end 2316(3) of winding 2403(3), and switching stage 2502(4) is electrically coupled to second end 2318(4) of winding 2403(4). Each switching stage 2502 is configured to repeatedly switch its respective winding end between at least two different power nodes (not shown). An example possible configuration of switching stages 2502 is discussed below with respect to FIG. 33.

FIG. 25 is marked-up to show approximate magnetic flux flow when respective currents $I_1$, $I_2$, $I_3$, and $I_4$ flow between switching stages 2502 and windings 2304, as depicted in FIG. 25. Each circle enclosing a dot represents magnetic flux flowing out of the page, and each circle enclosing an "X" represents magnetic flux flowing into the page. Respective magnetic fluxes generated by adjacent windings 2304 oppose each other, i.e. flow in opposite directions, in portions of magnetic core 2302 separating the adjacent windings. For example, respective magnetic fluxes generated by currents $I_1$ and $I_2$ flowing through windings 2304(1) and 2304(2) oppose each other in a portion 2504(1) of magnetic core 2302 separating windings 2304(1) and 2304(2). As another example, respective magnetic fluxes generated by currents $I_1$ and $I_3$ flowing through windings 2304(1) and 2304(3) oppose each other in a portion 2504(2) of magnetic core 2302 separating windings 2304(1) and 2304(3). The fact that magnetic fluxes oppose each other in portions of magnetic core 2302 separating windings 2304 helps prevent saturation of magnetic material between adjacent windings 2304, thereby enabling the windings to be placed close together in directions 2308 and 2310 without incurring magnetic saturation.

A separation distance between adjacent windings 2304 in the direction 2308 is $aW_o$, where a is less than or equal to one, for reasons analogous to those discussed above with respect to integrated inductor assembly 700. Similarly, a separation distance between adjacent windings 2304 in the direction 2310 is $bW_1$, where b is less than or equal to one. Thus, the configuration of integrated inductor assembly 2300 enables windings 2304 to be close together still minimizing possibility of saturation of magnetic material between windings 2304. Therefore, integrated inductor assembly 2300 may be significantly smaller than conventional co-packaged discrete inductors having similar inductance and saturation current ratings. Size decrease achievable by use of integrated inductor assembly 700 can be expressed by EQNS. 2 and 3 below, where $WI_x$ is width improvement in direction 2308 (decrease in width in direction 2308), and $WI_y$ is width improvement in direction 2310 (decrease in width in direction 2310). $N_x$ in EQN. 2 is number of required inductors in direction 2308, $N_y$ in EQN. 3 is number of required inductors in direction 2310, and d in each of EQNS. 2 and 3 is minimum required separation distance between adjacent discrete inductors. As evident from EQNS. 2-3, use of integrated inductor assembly 2300 in place of conventional discrete inductors can achieve a significant savings in space occupied by inductors, especially in cases where a and b are small and/or many inductors are required.

$$WI_x = (N_x - 1)(W_o(2 - a) + d) \qquad \text{EQN. 2}$$

$$WI_y = (N_y - 1)(W_l(2 - b) + d) \qquad \text{EQN. 3}$$

Turns of a given winding are stacked in a direction parallel to a winding axis, in the examples discussed above. For example, turns of winding 704(1) are stacked in a direction of winding axis 718(1), as illustrated in FIG. 11. However, any of the integrated inductor assemblies disclosed herein can be modified so that turns of a given winding are stacked in a different direction or in multiple directions.

Figure 26:
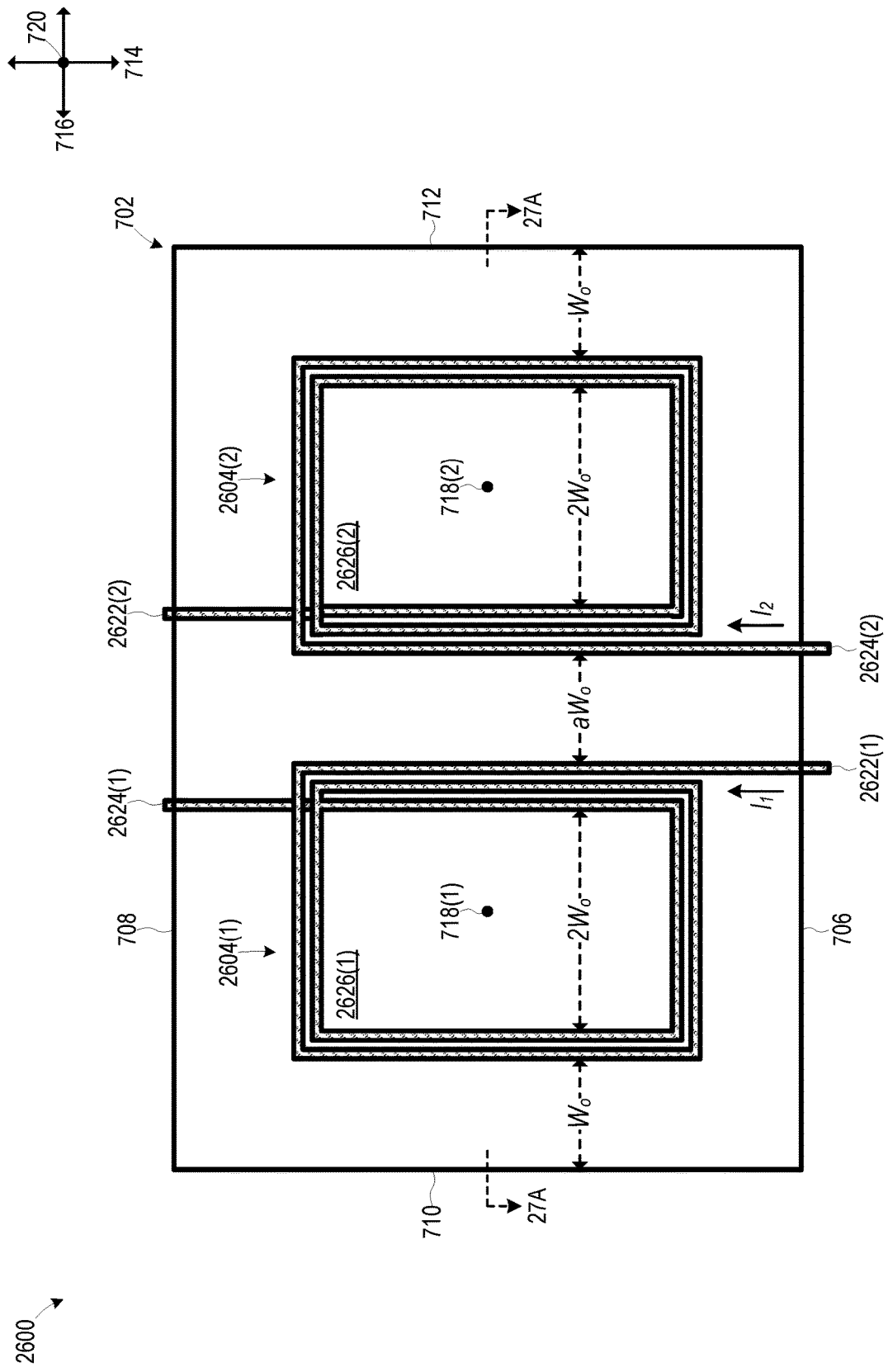
FIG. 26 is a top plan view of another integrated inductor assembly, according to an embodiment.
Figure 27:
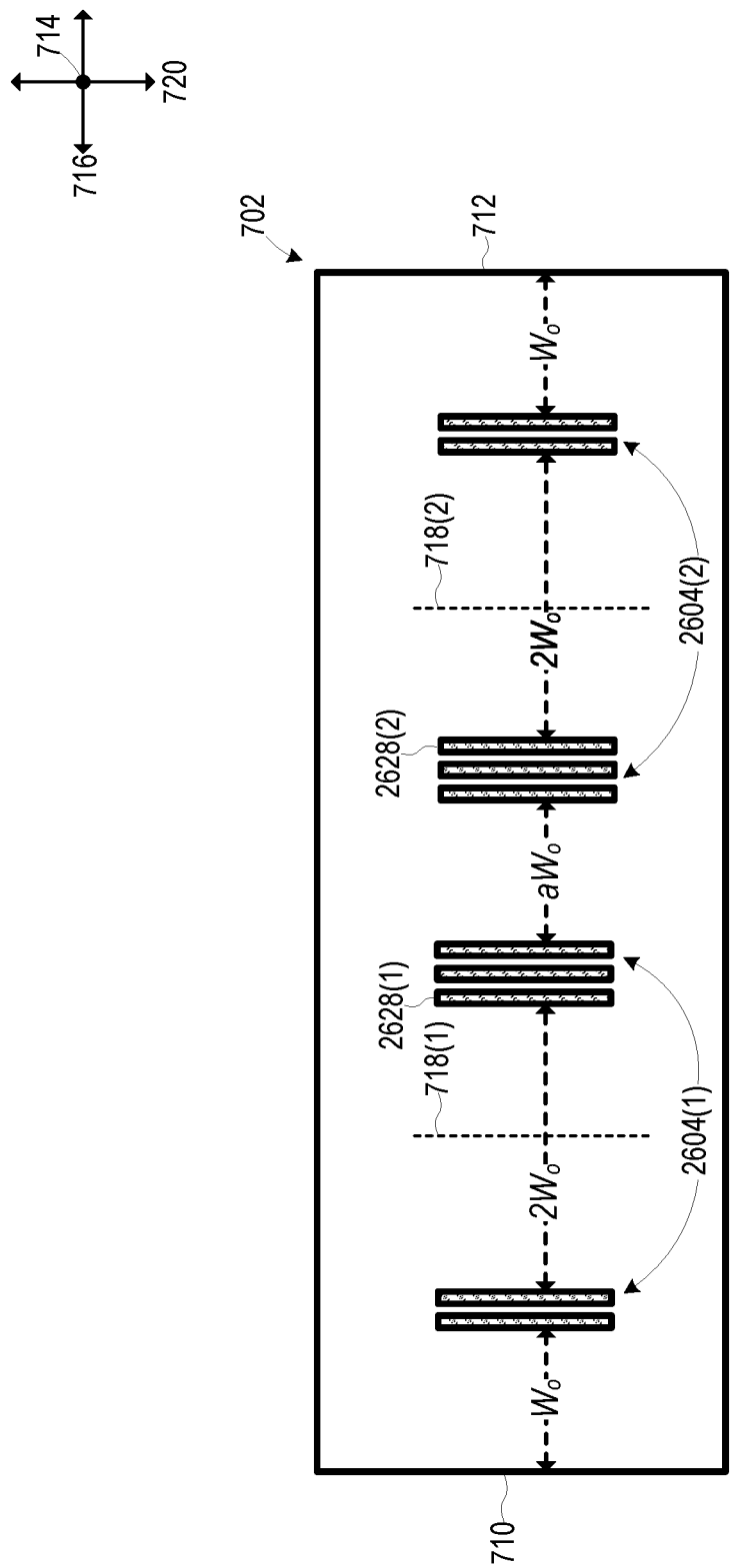
FIG. 27 is a cross-sectional view of the FIG. 26 integrated inductor assembly.

For example, FIG. 26 is a top plan view and FIG. 27 is a cross-sectional view analogous to FIGS. 10 and 11, respectively, of an integrated inductor assembly 2600. Integrated inductor assembly 2600 is an alternate embodiment of integrated inductor assembly 700 where windings 704 are replaced with windings 2604. Magnetic core 702 is shown in outline view in FIG. 26, i.e. only its outline is shown, to enable windings 2604 to be seen. The cross-section of FIG. 27 is taken along lines 27A-27A of FIG. 26. Each winding 2604 has a first end 2622 and an opposing second end 2624. Each winding 2604 also forms a fractional turn 2628 in addition to one or more complete turns. The terminations of the windings can have a different cross section and shape from the windings, to allow terminations to pass around the turns of the windings.

Adjacent turns of a given winding 2604 are stacked in a direction that is normal to the respective winding axis 718 of the winding 2604. Each winding 2604 encloses a respective area 2626, as seen when viewed cross-sectionally in direction 720. Although areas 2626 are illustrated as having a rectangular shape, windings 2604 could be modified so that areas 2626 have different shapes. For example, windings 2604 could be modified to form rounded corners instead of rectangular corners, so that areas 2626 have rounded-rectangular shapes. Additionally, while windings 2604 are illustrated as being formed of conductive foil, such as copper foil, windings 2604 could be formed of other conductive material, such as single-strand or multi-strand wire. Furthermore, the number of turns formed by each winding 2604 may vary.

Figure 28:
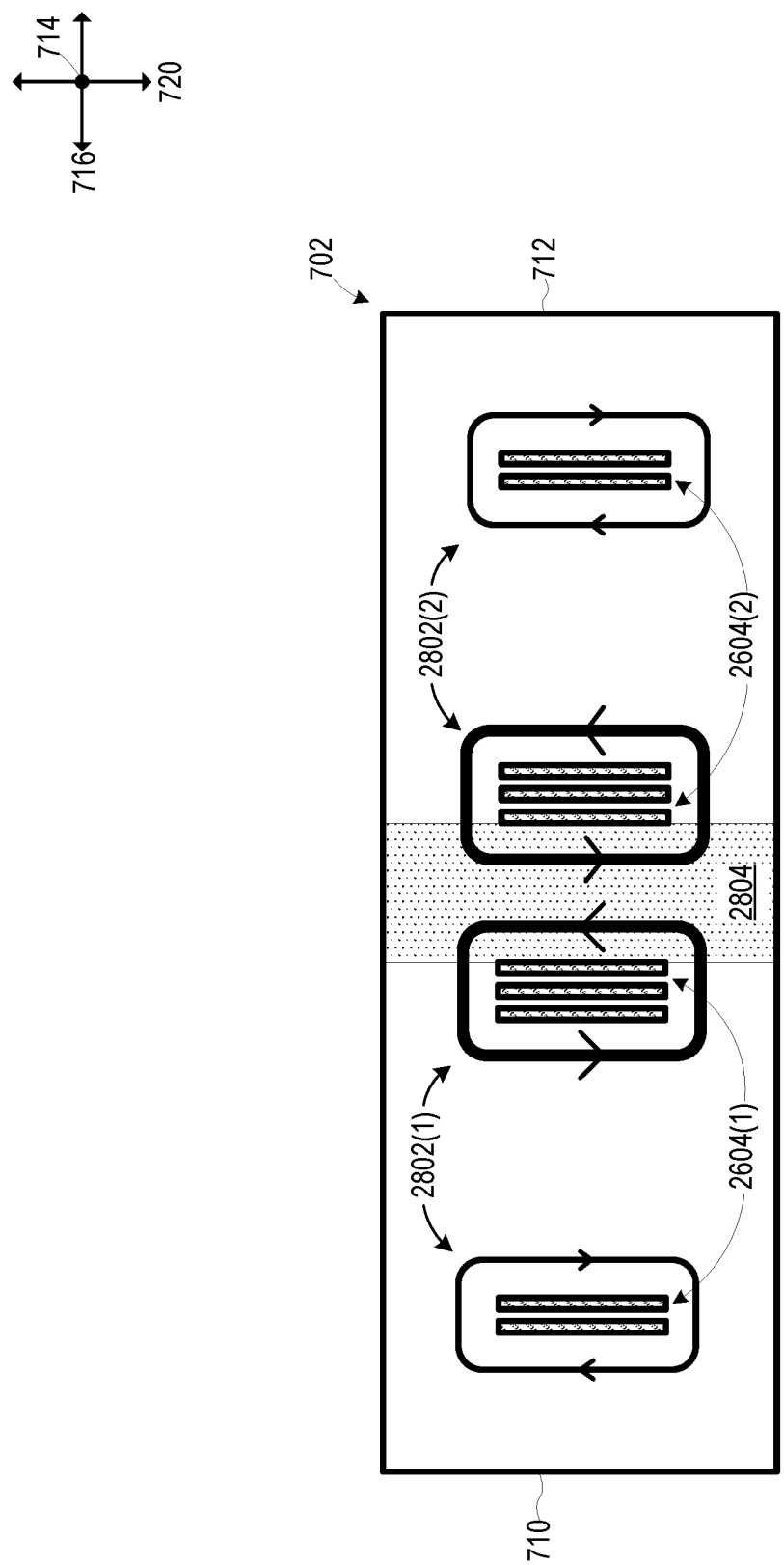
FIG. 28 is a cross-sectional view of the FIG. 26 integrated inductor assembly that is marked up to show approximate magnetic flux paths.

FIG. 28 is a cross-sectional view like that of FIG. 27 but marked-up to show approximate magnetic flux paths. FIG. 28 assumes that currents $I_1$ and $I_2$ flow into winding ends 2622(1) and 2624(2), as illustrated in FIG. 26. Currents $I_1$ and $I_2$ are generated, for example, by respective switching stages (not shown) analogous to switching stages 1302 of FIG. 13 which are electrically coupled to winding ends 2622(1) and 2624(2). Current $I_1$ induces first magnetic flux 2802(1) in magnetic core 702, and current $I_2$ induces second magnetic flux 2802(2) in magnetic core 702, as illustrated in FIG. 28. The fact that windings 2604 have opposing orientations in integrated inductor assembly 2600, as seen when viewed cross-sectionally in direction 720, results in magnetic fluxes 2802(1) and 2802(2) opposing each other in a separation portion 2804 of magnetic core 702 which separates windings 2604 in direction 716. The opposing magnetic fluxes in separation portion 2804 enable adjacent windings 2604(1) and 2604(2) to be close together without saturating magnetic material between the windings.

Figure 29:
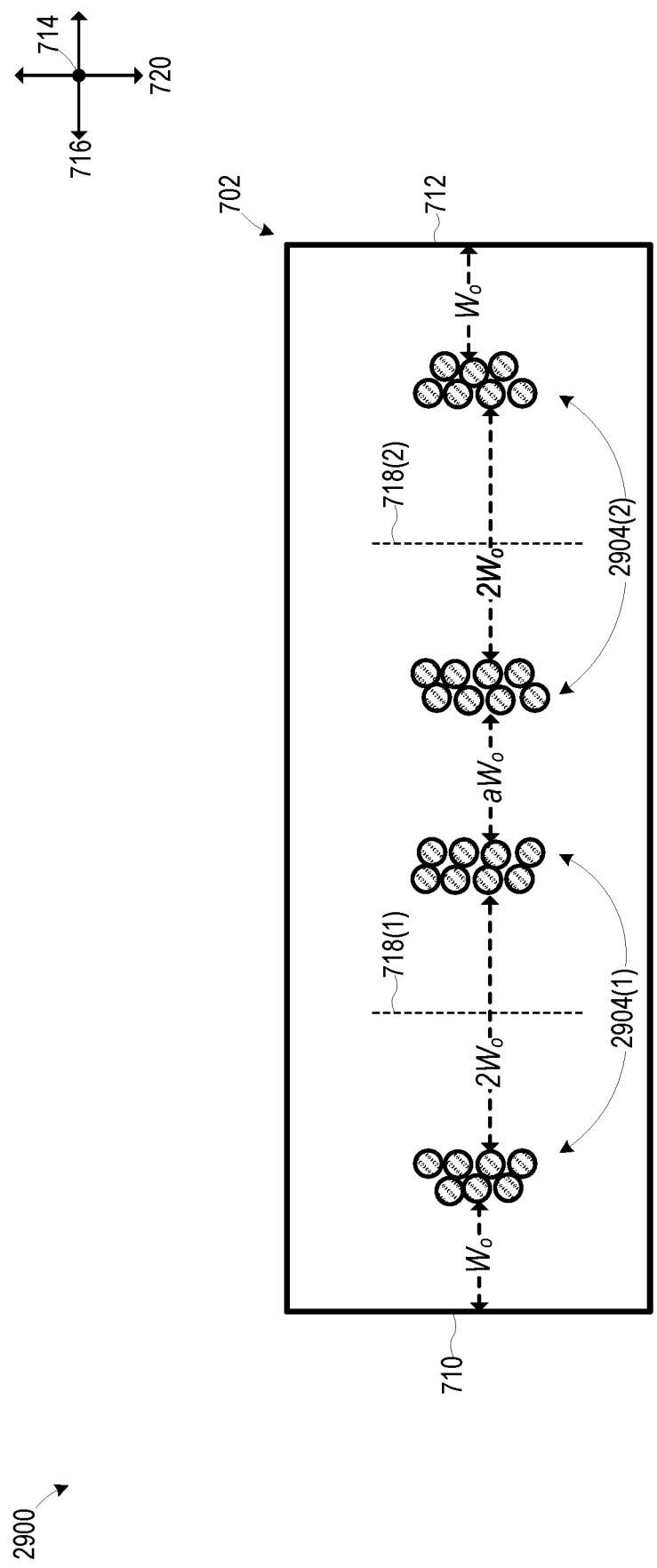
FIG. 29 is a cross-sectional view of an alternate embodiment of the FIG. 26 integrated inductor assembly where foil windings are replaced with wire windings.

FIG. 29 is a cross-sectional view of an integrated inductor assembly 2900, which is an alternate embodiment of integrated inductor assembly 2600 where foil windings 2604 are replaced with wire windings 2904. The cross-sectional view of FIG. 29 is analogous to that of FIG. 27. Turns of a given winding 2904 are stacked in multiple directions, i.e. in direction 720 as well as in a direction that is normal to a respective winding axis 718. Integrated inductor assembly 2900 optionally includes a bobbin (not shown) on which windings 2904 are wound.

Figure 30:
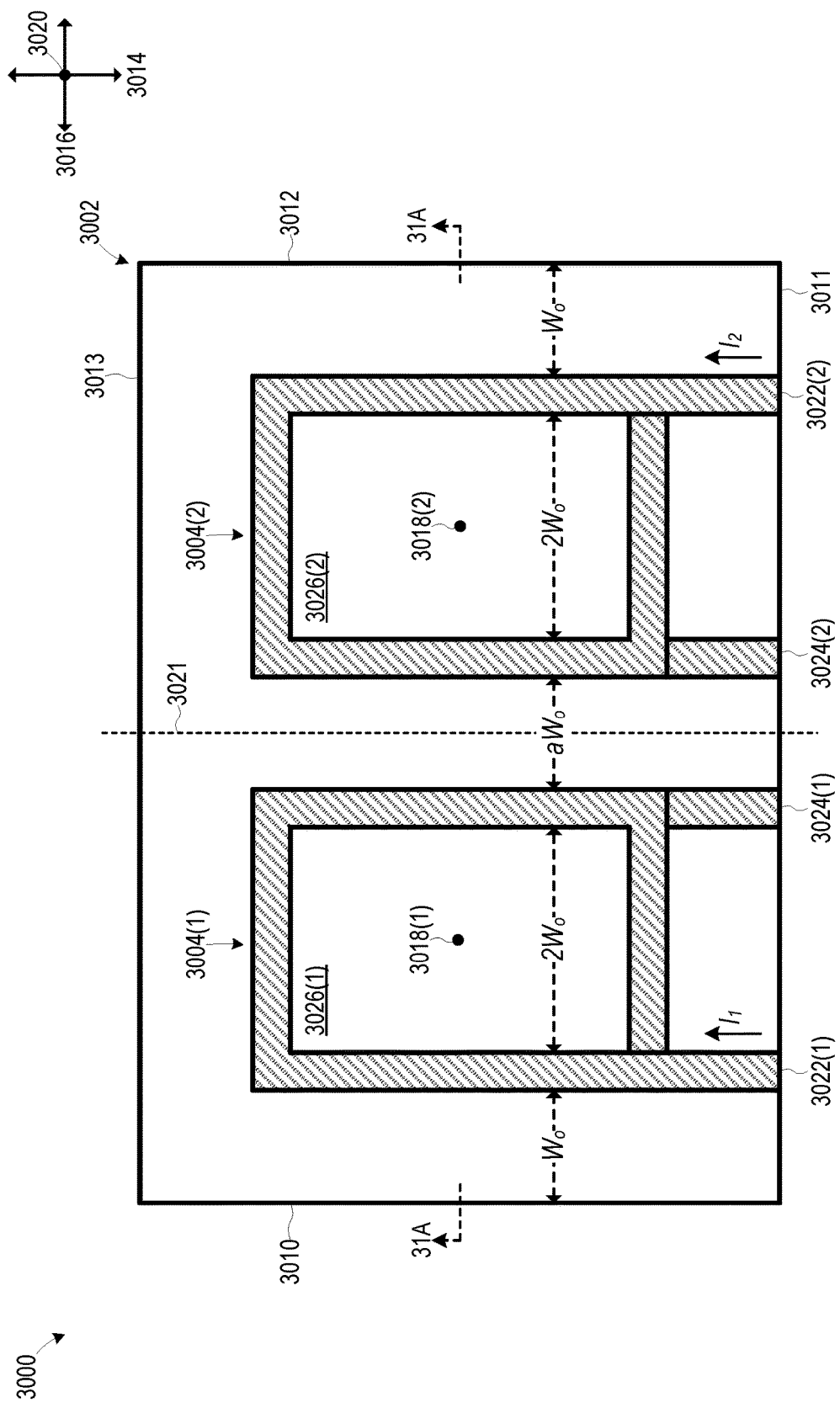
FIG. 30 is a front elevational view of another integrated inductor assembly, according to an embodiment.
Figure 31:
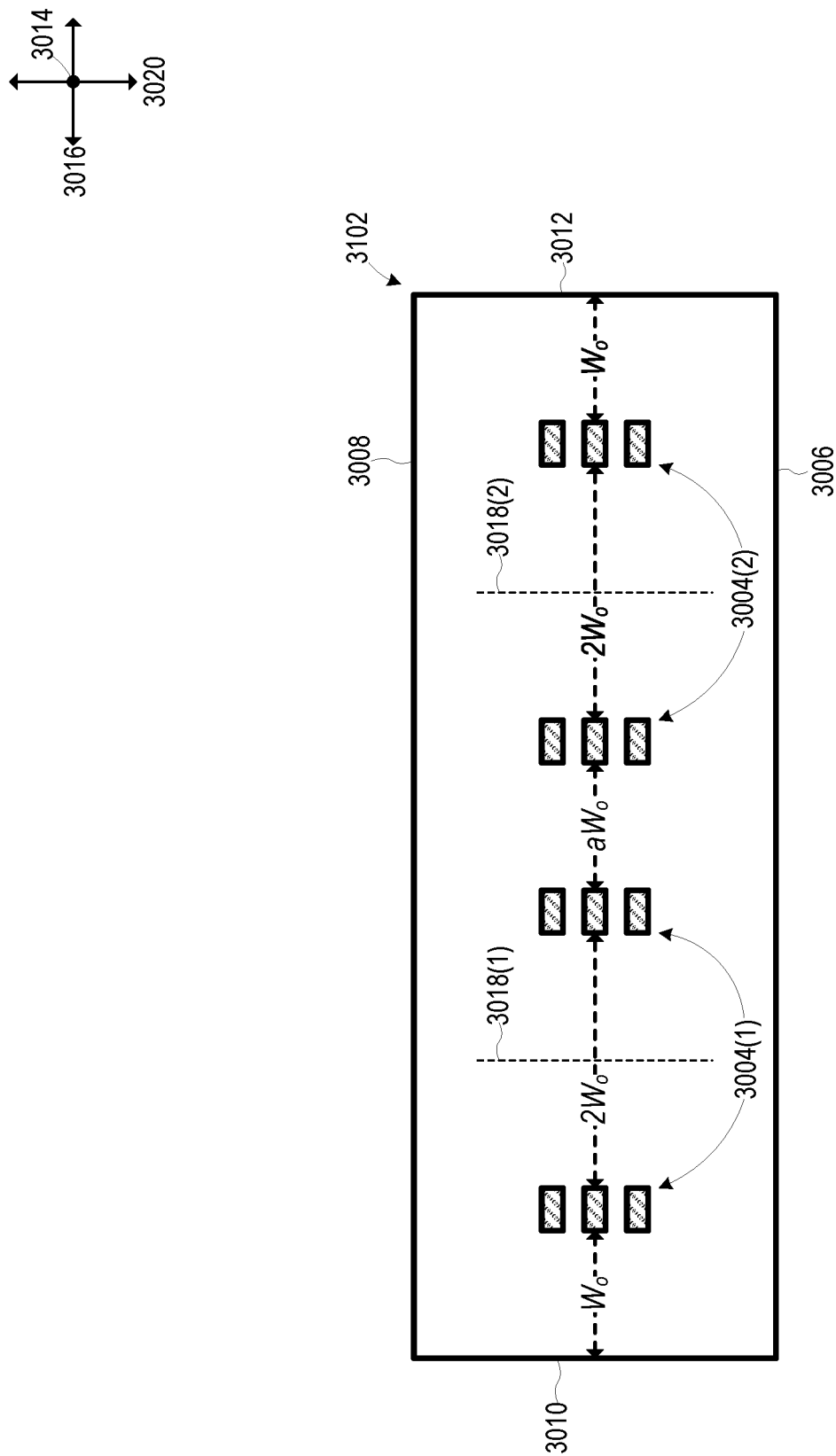
FIG. 31 is a cross-sectional view of the FIG. 30 integrated inductor assembly taken along line 31A-31A of FIG. 30.

The integrated inductor assemblies disclosed herein could be modified to facilitate different orientations of the assemblies on a PCB or other substrate. For example, FIG. 30 is a front elevational view of an integrated inductor assembly 3000, and FIG. 31 is a cross-sectional view of integrated inductor assembly 3000 taken along line 31A-31A of FIG. 30. Integrated inductor assembly 3000 is similar to integrated inductor assembly 700, but with a different configuration of windings to facilitate mounting with a vertical winding orientation. A magnetic core 3002 of integrated inductor assembly 3000 is shown in outline view in FIG. 30, i.e. only the outline of magnetic core 3002 is shown, to show windings 3004 of the integrated inductor assembly.

Integrated inductor assembly 3000 includes magnetic core 3002 and a plurality of windings 3004 at least partially disposed therein. Magnetic core 3002 includes a front side 3006, a back side 3008, a left side 3010, a right side 3012, a bottom side 3011, and a top side 3013, as collectively shown in FIGS. 30 and 31. Front side 3006 and back side 3008 are separated from each other in a direction 3020, and left side 3010 and right side 3012 are separated from each other in a direction 3016 that is orthogonal to direction 3020. Bottom side 3011 and top side 3013 are separated from each other in a direction 3014 that is orthogonal to each of directions 3016 and 3020.

Magnetic core 3002 is formed, for example, of a ferrite magnetic material or a mixture of a powder iron and binder. In some embodiments, magnetic core 3002 is a homogenous magnetic core formed of a single material, while in some other embodiments, magnetic core 3002 is a composite magnetic core formed of two of more different magnetic materials. Magnetic core 3002 may be either a monolithic magnetic core, such as a magnetic core molded around windings 3004, or a magnetic core formed of two or more elements that are joined together. Integrated inductor assembly 3000 can also be implemented in multilayer film technology. For example, in particular embodiments, magnetic core 3002 and windings 3004 are formed by disposing multiple magnetic film layers and conductive film layers on a substrate.

Each winding 3004 is at least partially wound around a respective winding axis 3018 extending in direction 3020. Winding axes 3018 are offset from each other in direction 3016, and windings 3004 are accordingly separated from each other in direction 3016. The number of turns formed by each winding 3004 may vary without departing from the scope hereof, and each winding 3004 need not form the same number of turns. Additionally, integrated inductor assembly 3000 could be modified to include additional windings 3004, such as in a manner analogous to that discussed above with respect to FIGS. 19 and 20.

Each winding has a first end 3022 and an opposing second end 3024. First ends 3022 and second ends 3024 terminate at bottom side 3011 of magnetic core 3002, which facilitates placing integrated inductor assembly 3002 on a PCB or other substrate such that bottom surface 3011 faces the PCB/substrate. In some embodiments, first ends 3022 and/or second ends 3024 include an element (not shown) for physically connecting to a PCB or other structure, such as a solder tab or a through-hole post. Each winding 3004 encloses a respective area 3026, as seen when viewed cross-sectionally in direction 3026 (see FIG. 30). Each area 3026 has a width $2W_o$ in direction 3016. Although areas 3026 are illustrated as having a rectangular shape, windings 3004 could be modified so that areas 3026 have a different shape. For example, windings 3004 could be modified to form rounded corners instead of rectangular corners, such that areas 3026 have a rounded-rectangular shape. Windings 3004 are illustrated as being formed of metallic foil, such as copper foil. However, windings 3004 could be formed of other electrically conductive materials, such as single-strand wire or multi-strand wire (e.g. Litz wire).

Importantly, adjacent windings 3004 have opposing orientations, as seen when viewed cross-sectionally in direction 3020 (see FIG. 30). For example, first end 3022(1) of winding 3004(1) is on the left side of the winding, while first end 3022(2) of winding 3004(2) is on the right side of the winding, as seen when viewed cross-sectionally in direction 3020. Similarly, second end 3024(1) of winding 3004(1) is on the right side of the winding, while second end 3024(2) of winding 3004(2) is on the left side of the winding, as seen when viewed cross-sectionally in direction 3020. Accordingly, while winding 3004(2) has the same shape and size as winding 3004(1), winding 3004(2) is a mirror image of winding 3004(1), with respect to an axis of symmetry 3021 of integrated inductor assembly 3000 extending in direction 3014. A separation distance between adjacent windings 3004 in direction 3016 is $aW_o$, and a is less than or equal to one for reasons analogous to those discussed above with respect to integrated inductor assembly 700. EQN. 1 also applies to integrated inductor assembly 3000.

Figure 32:
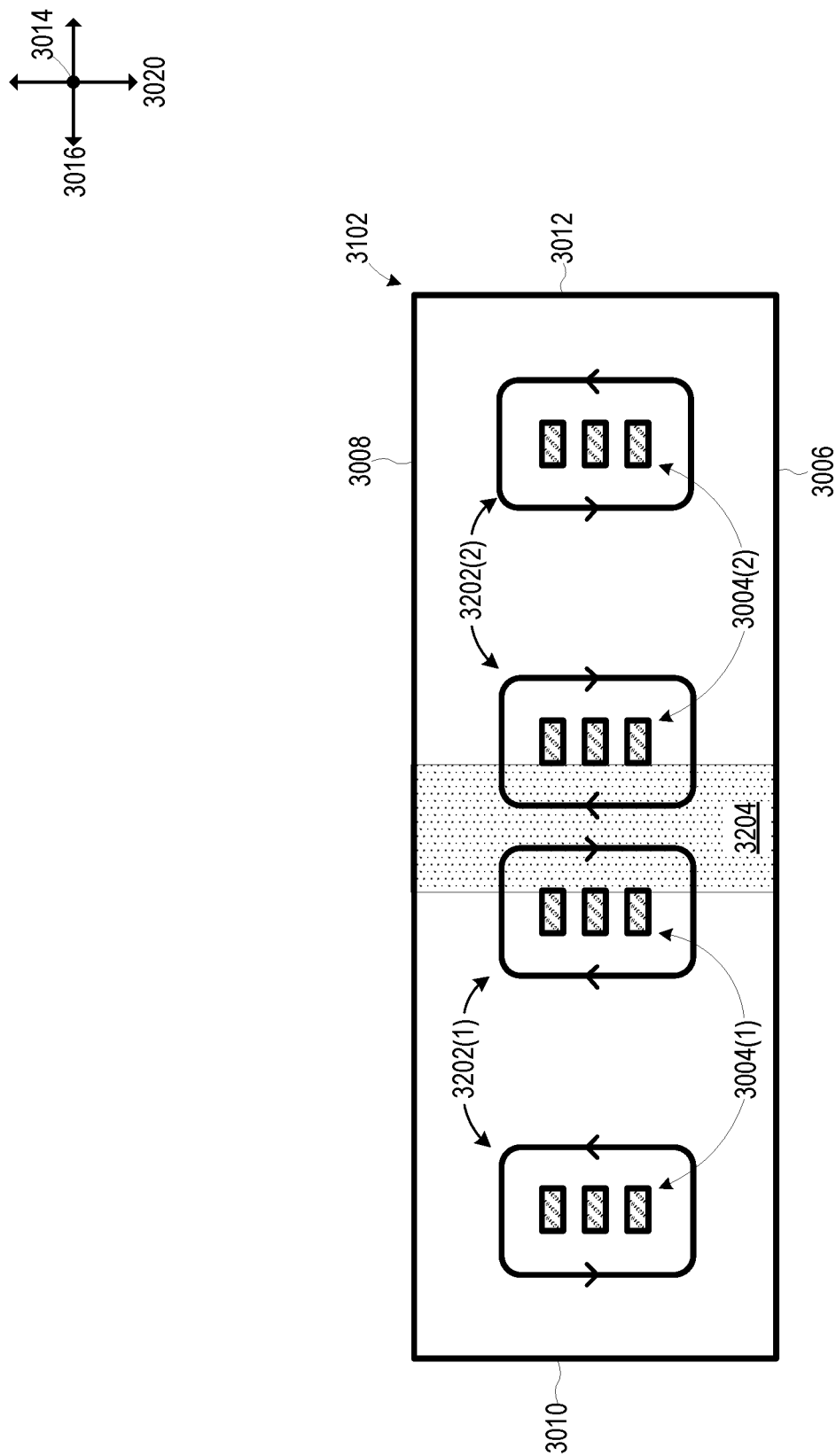
FIG. 32 is a cross-sectional view of the FIG. 30 integrated inductor assembly that is marked up to show approximate magnetic flux paths.

FIG. 32 is cross-sectional view like that of FIG. 31 but marked-up to show approximate magnetic flux paths. FIG. 32 assumes that currents $I_1$ and $I_2$ flow into winding ends 3022(1) and 3022(2), as illustrated in FIG. 30. Currents $I_1$ and $I_2$ are generated, for example, by respective switching stages (not shown) analogous to switching stages 1302 of FIG. 13 which are electrically coupled to winding ends 3022(1) and 3022(2).

Current $I_1$ induces first magnetic flux 3202(1) in magnetic core 3002, and current $I_2$ induces second magnetic flux 3202(2) in magnetic core 3002, as illustrated in FIG. 32. The fact that windings 3004 have opposing orientations in integrated inductor assembly 3000, as seen when viewed cross-sectionally in direction 3020, results in magnetic flux 3202(1) and 3202(2) opposing each other in a separation portion 3204 of magnetic core 3102. Separation portion 3204 of magnetic core 3102 separates windings 3004(1) and 3004(2) in direction 3016. These opposing magnetic fluxes in separation portion 3204 enable adjacent windings 3004(1) and 3004(2) to be close together without saturating magnetic material between the windings. Additionally, it should be noted that windings 3004 do not form fractional turns.

Figure 33:
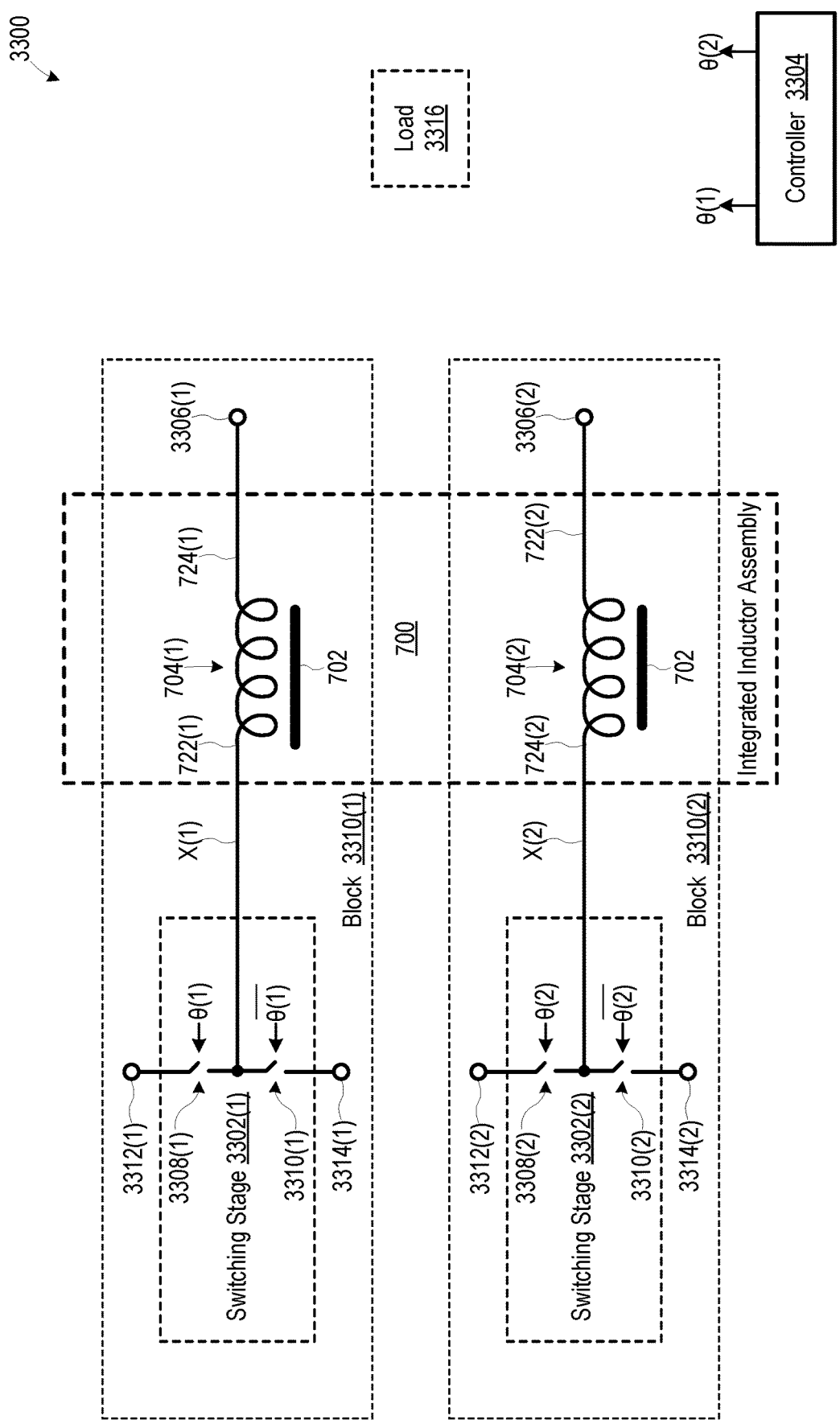
FIG. 33 is a schematic diagram of a switching power converter assembly including an instance of the FIG. 7 integrated inductor assembly, according to an embodiment.

FIG. 33 illustrates another example application of the new integrated inductor assemblies disclosed herein. Specifically, FIG. 33 is a schematic diagram of a switching power converter assembly 3300 including an instance of integrated inductor assembly 700, a plurality of switching stages 3302, and a controller 3304. The components depicted in FIG. 33 are, for example, disposed on a common substrate (e.g., a PCB), or they may be distributed among two or more separate substrates. Integrated inductor assembly 700 is illustrated in FIG. 33 to schematically show magnetic core 702 and windings 704. Although windings 704 share magnetic core 702, there is no material magnetic coupling between windings 704, which is symbolically shown in FIG. 33 by each winding 704 have its own respective portion of magnetic core 702.

Ends 722(1) and 724(1) of winding 704(1) are electrically coupled to a switching node X(1) and a power node 3306(1), respectively. Ends 724(2) and 722(2) of winding 704(2) are electrically coupled to a switching node X(2) and a power node 3306(2), respectively. Each switching stage 3302 is electrically coupled to a respective winding 704, as discussed further below. Each switching stage 3302 and respective winding 704 pair may be referred to as a "block" 3310. For example, block 3310(1) includes switching stage 3302(1) and winding 704(1). Accordingly, switching power converter assembly 3300 is a two-block switching power converter assembly. However, switching power converter assembly 3300 could be modified to have additional blocks 3310. Additionally, each block 3310 may include additional components (not shown), including but not limited to capacitors, driver circuitry, and/or monitoring circuitry.

Each switching stage 3302 includes a first switching device 3308 electrically coupled between a respective power node 3312 and the respective switching node X of the block 3310 including the switching stage. Additionally, each switching stage 3302 includes a second switching device 3310 electrically coupled between the respective switching node X and a respective power node 3314 of the block 3310 including the switching stage. Each switching device 3308 and 3310 includes, for example, one or more transistors, such as one or more field effect transistors (FETs), one or more bipolar junction transistors (BJTs), and/or one or more insulated gate bipolar junction transistors (IGBTs). In some embodiments, switching stages 1302, 2102, and 2502, of FIGS. 13, 21, and 25, respectively, are configured in the same manner as switching stages 3302.

Controller 3304 is configured to generate control signals $\theta(1)$ and $\theta(2)$ for controlling switching stages 3302(1) and 3302(2), respectively. Each switching stage 3302 is configured to repeatedly switch the terminal 722 or 724 of its respective winding 704 between at least power nodes 3312 and 3314, in response to a respective control signal θ from controller 3304. For example, in certain embodiments, each first switching device 3308 operates in its on-state (conductive state) when its respective control signal θ is asserted, and each first switching device 3308 operates in its off-state (non-conductive state) when its respective control signal θ is de-asserted. Additionally, in these embodiments, each second switching device 3310 operates in its off-state (non-conductive state) when its respective control signal θ is asserted, and each second switching device 3310 operates in its on-state (conductive state) when its respective control signal θ is de-asserted. Accordingly, in particular embodiments, first and second switching devices 3308 and 3310 within a given switching stage 3302 switch in a nominally complementary manner, although there may be deadtime where both of the first and second switching devices 3308 and 3310 operate in their respective off-states to prevent shoot through.

In some embodiments, controller 3304 is configured to generate control signals $\theta(1)$ and $\theta(2)$ so that switching stages 3302 switch out-of-phase with respect to each other. For example, in one embodiment, controller 3304 is configured to generate control signals $\theta(1)$ and $\theta(2)$ so that switching stages 3302 switch 180 degrees out-of-phase with respect to each other. Additionally, in some embodiments, controller 3304 is configured to generate control signals $\theta(1)$ and $\theta(2)$ to regulate one or more parameters of switching power converter 3300, such as magnitude of voltage at one of more nodes, and/or current flowing into or out of one or more nodes.

In certain embodiments, each power node 3312 is an input power node, each power node 3314 is a reference power node, and each power node 3306 is an output power node, such that switching power converter assembly 3300 has a buck-type topology. In some other embodiments, each power node 3306 is an input power node, each power node 3312 is an output power node, and each power node 3314 is a reference power node, such that switching power converter assembly 3300 has a boost-type topology. In yet some other embodiments, each power node 3312 is an input power node, each power node 3314 is an output power node, and each power node 3306 is a reference power node, such that switching power converter assembly 3300 has a buck-boost-type topology.

In some embodiments, each block 3310 is itself a switching power converter, such that assembly 3300 includes two separate switching power converters. For example, in certain embodiments, each block 3310 is itself a buck converter, a boost converter, or a buck-boost converter configured to provide a different power supply voltage. Two or more blocks 3310 are optionally connected in a daisy chain fashion. For example, an output of one block 3310 may be connected to an input of another block 3310, such that one block 3310 provides an input power to another block 3310. In other embodiments, assembly 3300 is a multi-phase switching power converter, and each block 3310 is a respective phase of the multi-phase switching power converter. For example, in some embodiments, each block 3310 is a respective phase of a multi-phase buck converter, a multi-phase boost converter, or a multi-phase buck-boost converter.

Switching power converter assembly 3300 is optionally configured to power one or more loads 3316. Loads 3316 need not be part of switching power converter assembly 3300. In embodiments where each block 3310 is a separate switching power converter, each block 3310 may power its own respective load 3316. Connections (not shown) between loads 3316 and nodes of switching power converter assembly 3300 will vary depending on the topology of switching power converter assembly 3300. In some embodiments, each load 3316 includes one or more integrated circuits, including but not limited to, a processing unit (e.g. a central processing unit (CPU) or a graphics processing unit (GPU)), a field programmable gate array (FPGA), an application specific integrated circuit (ASIC) (e.g. for artificial intelligence and/or machine learning), and/or a memory unit.

Although each of switching stages 3302 and controller 3304 are illustrated as being discrete elements, two or more of these elements may be partially or fully combined. For example, in one embodiment, elements of controller 3304 are distributed among switching stages 3302. Additionally, integrated inductor assembly 700 could be replaced with another one of the integrated inductor assemblies disclosed herein, with changes to the number of switching stages 3302 and controls signals θ generated by controller 3304, as appropriate. For example, an alternate embodiment of switching power converter 3300 includes four blocks 3310, and integrated inductor assembly 700 is replaced with integrated inductor assembly 1900 or 2300.

Combinations of Features

Features described above may be combined in various ways without departing from the scope hereof. The following examples illustrate some possible combinations.

(A1) A switching power converter includes an integrated inductor assembly including (1) a magnetic core, (2) a first winding disposed at least partially in the magnetic core, the first winding being wound around a first winding axis extending in a first direction, and (3) a second winding disposed at least partially in the magnetic core and being separated from the first winding in a second direction by a first separation portion of the magnetic core, the second direction being orthogonal to the first direction, and the second winding being wound around a second winding axis extending in the first direction. The switching power converter further includes a first switching stage and a second switching stage. The first switching stage is configured to repeatedly switch an end of the first winding between at least two different power nodes, and the first switching stage is electrically coupled to the end of the first winding such that a first current flowing from the first switching stage to the end of the first winding induces first magnetic flux flowing through the first separation portion of the magnetic core. The second switching stage is configured to repeatedly switch an end of the second winding between at least two different power nodes, and the second switching stage is electrically coupled to the end of the second winding such that a second current flowing from the second switching stage to the end of the second winding induces second magnetic flux flowing through the first separation portion of the magnetic core that opposes the first magnetic flux flowing through the first separation portion of the magnetic core.

(A2) In the switching power converter denoted as (A1), a cross-sectional area enclosed by the first winding, as seen when viewed cross-sectionally in the first direction, may have a first width in the second direction, and the second winding may be separated from the first winding in the second direction by a first separation distance that is no greater than one half of the first width.

(A3) In the switching power converter denoted as (A2), a cross-sectional area enclosed by the second winding, as seen when viewed cross-sectionally in the first direction, may have a second width in the second direction that is substantially equal to the first width.

(A4) In any one of the switching power converters denoted as (A1) through (A3), (1) the first winding may form a first fractional turn, in addition to one or more complete turns, around the first winding axis, (2) the second winding may form a second fractional turn, in addition to one or more complete turns, around the second winding axis, (3) the first fractional turn may be located in a portion of the first winding that is closest to the second winding in the second direction, and (4) the second fractional turn may be located in a portion of the second winding that is closest to the first winding in the second direction.

(A5) In any one of the switching power converters denoted as (A1) through (A4), the first winding axis may be offset from the second winding axis in the second direction.

(A6) In any one of the switching power converters denoted as (A1) through (A5), the second winding may be rotated with respect to the first winding by substantially 180 degrees, as seen when viewed cross-sectionally in the first direction.

(A7) In any one of the switching power converters denoted as (A1) through (A6), the integrated inductor assembly may further include (1) a third winding disposed at least partially in the magnetic core, the third winding being wound around a third winding axis, and (2) a fourth winding disposed at least partially in the magnetic core and being separated from the third winding in the second direction by a second separation portion of the magnetic core, the fourth winding being wound around a fourth winding axis extending in the first direction. The switching power may further include a third switching stage and a fourth switching stage. The third switching stage is configured to repeatedly switch an end of the third winding between at least two different power nodes, and the third switching stage is electrically coupled to the end of the third winding such that a third current flowing from the third switching stage to the end of the third winding induces third magnetic flux flowing through the second separation portion of the magnetic core. The fourth switching stage is configured to repeatedly switch an end of the fourth winding between at least two different power nodes, and the fourth switching stage is electrically coupled to the end of the fourth winding such that a fourth current flowing from the fourth switching stage to the end of the fourth winding induces fourth magnetic flux flowing through the second separation portion of the magnetic core that opposes the third magnetic flux flowing through the second separation portion of the magnetic core.

(A8) In the switching power converter denoted as (A7), each of the third and fourth windings and may be separated from each of the first and second windings and in the second direction.

(A9) In the switching power converter denoted as (A7), the third winding may be separated from the first winding in a third direction that is orthogonal to each of the first and second directions, and the fourth winding may be separated from the second winding in the third direction.

(B1) An integrated inductor assembly includes (1) a magnetic core, (2) a first winding disposed at least partially in the magnetic core, the first winding being wound around a first winding axis extending in a first direction, and a cross-sectional area enclosed by the first winding, as seen when viewed cross-sectionally in the first direction, having a first width in a second direction that is orthogonal to the first direction, and (3) a second winding disposed at least partially in the magnetic core and being separated from the first winding in the second direction by a first separation distance that is no greater than one half of the first width, the second winding being wound around a second winding axis extending in the first direction.

(B2) In the integrated inductor assembly denoted as (B1), a cross-sectional area enclosed by the second winding, as seen when viewed cross-sectionally in the first direction, may have a second width in the second direction that is substantially equal to the first width.

(B3) In any one of the integrated inductor assemblies denoted as (B1) and (B2), (1) the first winding may form a first fractional turn, in addition to one or more complete turns, around the first winding axis, (2) the second winding may form a second fractional turn, in addition to one or more complete turns, around the second winding axis, (3) the first fractional turn may be located in a portion of the first winding that is closest to the second winding in the second direction, and (4) the second fractional turn may be located in a portion of the second winding that is closest to the first winding in the second direction.

(B4) In any one of the integrated inductor assemblies denoted as (B1) through (B3), the cross-sectional area enclosed by the first winding, as seen when viewed cross-sectionally in the first direction, may have a first rectangular shape, and the cross-sectional area enclosed by the second winding, as seen when viewed cross-sectionally in the first direction, may have a second rectangular second shape.

(B5) In any one of the integrated inductor assemblies denoted as (B1) through (B4), the first winding axis may be offset from the second winding axis in the second direction.

(B6) In any one of the integrated inductor assemblies denoted as (B1) through (B5), the magnetic core may form a first gap in the first direction, in a magnetic flux path of the first winding, and the magnetic core may form a second gap in the first direction, in a magnetic flux path of the second winding.

(B7) Any one of the integrated inductor assemblies denoted as (B1) through (B6) may further include (1) a third winding disposed at least partially in the magnetic core, the third winding being wound around a third winding axis extending in the first direction, a cross-sectional area enclosed by the third winding, as seen when viewed cross-sectionally in the first direction, having a third width in the second direction, and (2) a fourth winding disposed at least partially in the magnetic core and being separated from the third winding in the second direction by a second separation distance that is no greater than one half of the third width, the fourth winding being wound around a fourth winding axis extending in the first direction.

(B8) In the integrated inductor assembly denoted as (B7), each of the third and fourth windings may be separated from each of the first and second windings in the second direction.

(B9) In the integrated inductor assembly denoted as (B7), the third winding may be separated from the first winding in a third direction that is orthogonal to each of the first and second directions, and the fourth winding may be separated from the second winding in the third direction.

(C1) An integrated inductor assembly includes (1) a magnetic core, (2) a first winding disposed at least partially in the magnetic core, the first winding being wound around a first winding axis extending in a first direction, and (3) a second winding disposed at least partially in the magnetic core and being separated from the first winding in a second direction that is orthogonal to the first direction. The second winding is wound around a second winding axis extending in the first direction, and the second winding is rotated by substantially 180 degrees with respect to the first winding, as seen when viewed cross-sectionally in the first direction.

(C2) In the integrated inductor assembly denoted as (C1), (1) the first winding may form a first fractional turn, in addition to one or more complete turns, around the first winding axis, (2) the second winding may form a second fractional turn, in addition to one or more complete turns, around the second winding axis, (3) the first fractional turn may be located in a portion of the first winding that is closest to the second winding in the second direction, and (4) the second fractional turn may be located in a portion of the second winding that is closest to the first winding in the second direction.

Changes may be made in the above devices, systems, and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A switching power converter, comprising:
an integrated inductor assembly, including:
   a magnetic core;
   a first winding disposed at least partially in the magnetic core, the first winding being wound around a first winding axis extending in a first direction, and
   a second winding disposed at least partially in the magnetic core and being separated from the first winding in a second direction by a first separation portion of the magnetic core, the second direction being orthogonal to the first direction, the second winding being wound around a second winding axis extending in the first direction;
a first switching stage configured to repeatedly switch an end of the first winding between at least two different power nodes, the first switching stage being electrically coupled to the end of the first winding such that a first current flowing from the first switching stage to the end of the first winding induces first magnetic flux flowing through the first separation portion of the magnetic core; and
a second switching stage configured to repeatedly switch an end of the second winding between at least two different power nodes, the second switching stage being electrically coupled to the end of the second winding such that a second current flowing from the second switching stage to the end of the second winding induces second magnetic flux flowing through the first separation portion of the magnetic core that opposes the first magnetic flux flowing through the first separation portion of the magnetic core.

2. The switching power converter of claim 1, wherein:
a cross-sectional area enclosed by the first winding, as seen when viewed cross-sectionally in the first direction, has a first width in the second direction;
the second winding is separated from the first winding in the second direction by a first separation distance that is no greater than one half of the first width.

3. The switching power converter of claim 2, wherein a cross-sectional area enclosed by the second winding, as seen when viewed cross-sectionally in the first direction, has a second width in the second direction that is substantially equal to the first width.

4. The switching power converter of claim 1, wherein:
the first winding forms a first fractional turn, in addition to one or more complete turns, around the first winding axis;
the second winding forms a second fractional turn, in addition to one or more complete turns, around the second winding axis;
the first fractional turn is located in a portion of the first winding that is closest to the second winding in the second direction; and
the second fractional turn is located in a portion of the second winding that is closest to the first winding in the second direction.

5. The switching power converter of claim 1, wherein the first winding axis is offset from the second winding axis in the second direction.

6. The switching power converter of claim 1, wherein the second winding is rotated with respect to the first winding by substantially 180 degrees, as seen when viewed cross-sectionally in the first direction.

7. The switching power converter of claim 1, wherein:
the integrated inductor assembly further includes:
   a third winding disposed at least partially in the magnetic core, the third winding being wound around a third winding axis, and
   a fourth winding disposed at least partially in the magnetic core and being separated from the third winding in the second direction by a second separation portion of the magnetic core, the fourth winding being wound around a fourth winding axis extending in the first direction;
the switching power converter further includes a third switching stage configured to repeatedly switch an end of the third winding between at least two different power nodes, the third switching stage being electrically coupled to the end of the third winding such that a third current flowing from the third switching stage to the end of the third winding induces third magnetic flux flowing through the second separation portion of the magnetic core; and
the switching power converter further incudes a fourth switching stage configured to repeatedly switch an end of the fourth winding between at least two different power nodes, the fourth switching stage being electrically coupled to the end of the fourth winding such that a fourth current flowing from the fourth switching stage to the end of the fourth winding induces fourth magnetic flux flowing through the second separation portion of the magnetic core that opposes the third magnetic flux flowing through the second separation portion of the magnetic core.

8. The switching power converter of claim 7, wherein each of the third and fourth windings and are separated from each of the first and second windings and in the second direction.

9. The switching power converter of claim 7, wherein:
the third winding is separated from the first winding in a third direction that is orthogonal to each of the first and second directions; and
the fourth winding is separated from the second winding in the third direction.

* * * * *